United States Patent [19]

Cross et al.

[11] 4,372,774
[45] Feb. 8, 1983

[54] THERMAL TREATMENT OF GLASS

[75] Inventors: Raymond P. Cross, Preston; Gordon T. Simpkin, Ormskirk, both of England

[73] Assignee: Pilkington Brothers Limited, St. Helens, England

[21] Appl. No.: 285,447

[22] Filed: Jul. 21, 1981

Related U.S. Application Data

[63] Continuation of Ser. No. 136,750, Apr. 2, 1980, abandoned, and a continuation-in-part of Ser. No. 24,988, Mar. 29, 1979, abandoned, and a continuation of Ser. No. 934,727, Aug. 21, 1978, abandoned.

[30] Foreign Application Priority Data

Aug. 17, 1978 [GB] United Kingdom ............... 33575/78

[51] Int. Cl.³ ............................................. C03B 27/00
[52] U.S. Cl. ....................................... 65/114; 65/104; 65/111; 65/116; 165/104.16
[58] Field of Search ................. 65/104, 111, 114, 116; 165/104.16

[56] References Cited

U.S. PATENT DOCUMENTS 3,075,580  1/1963  Davis, Jr. .................. 165/104.16 X
4,113,458  9/1978  Cross .............................. 65/104 X
4,120,681 10/1978  Cross et al. ........................... 65/114
4,300,936 11/1981  Quillevere et al. ............... 65/111 X

FOREIGN PATENT DOCUMENTS 2132289 11/1972 France ................................. 65/114

OTHER PUBLICATIONS

"Annealing and Fluidized-Bed Quenching of Nimonic-Alloy Sheets", I. Astley et al., Sheet Metal Industries, Sep. 62, pp. 601-608.

Primary Examiner—Arthur D. Kellogg
Attorney, Agent, or Firm—Burns, Doane, Swecker & Mathis

[57] ABSTRACT

The thermal treatment of glass is effected by contacting the glass, when it is hot, with a gas-fluidized mixture of particulate materials, at least one of which is selected to have gas-generating properties when heated by the hot glass. The materials are mixed in selected pre-determined proportions which impart to the mixture a thermal capacity and flowability which are such that a required thermal treatment is achieved.

The method is particularly suitable for the thermal toughening of glass sheets for vehicle windscreens.

30 Claims, 11 Drawing Figures

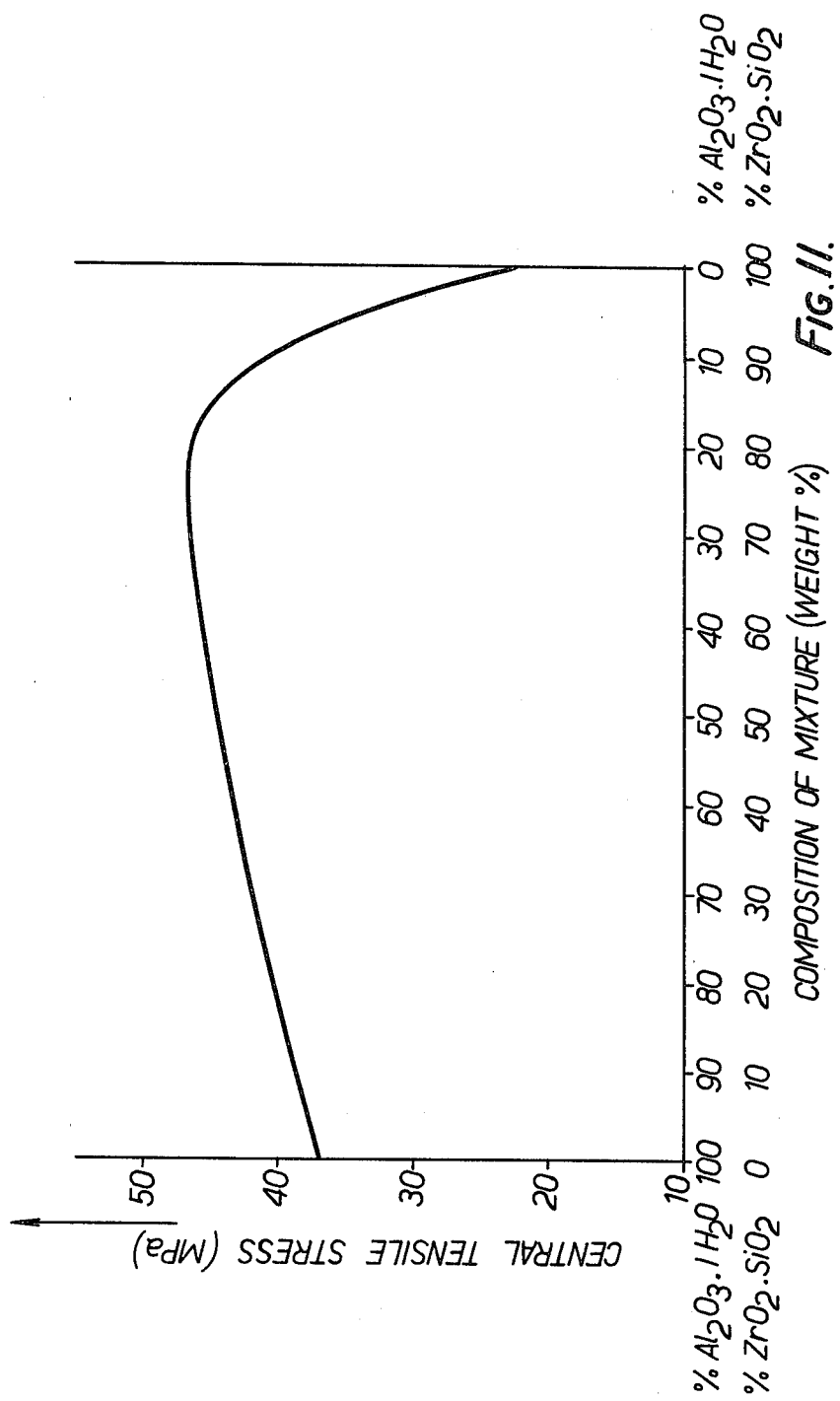
FIG. II.

THERMAL TREATMENT OF GLASS

CROSS-REFERENCES TO RELATED APPLICATIONS

This is a continuation of application Ser. No. 136,750, filed Apr. 2, 1980, and a continuation-in-part of copending application Ser. No. 24,988 filed Mar. 29, 1979; and a continuation of application Ser. No. 934,727 filed Aug. 21, 1978, all now abandoned. The disclosure of the aforesaid applications is hereby incorporated by reference.

BACKGROUND OF THE INVENTION

1. Field of the Invention

This invention relates to the thermal treatment of glass and more especially to the thermal toughening of flat glass or bent glass sheets, for example glass sheets for use singly as a motor vehicle windscreen, or as part of a laminated motor vehicle windscreen, or a side light or rear light for a motor vehicle, or for use in the construction of windscreen assemblies for aircraft and railway locomotives.

2. Description of the Prior Art

In our U.S. Pat. No. 4,113,458, there is described a method for thermally treating glass articles, by heating each glass article to a temperature above its strain point, and quenching the glass articles in turn in a gas-fluidised bed of particulate material which is placed in a quiescent uniformly expanded state of particulate fluidisation by control of the distribution of fluidising gas in the particulate material at a gas flow velocity through the particulate material between that velocity corresponding to incipient fluidisation and that velocity corresponding to maximum expansion of the particulate material.

This state of fluidisation of the bed is such that agitation of the fluidised particulate material is engendered on the hot immersed surfaces of the glass as the glass cools in the fluidised bed, but any transient tensile stresses induced in the surface of the hot glass as its leading edge first contacts the fluidised bed are not so severe as to endanger the glass. Therefore the process has a high yield.

The degree of toughening of a glass sheet which is immersed in such a fluidised bed depends on the rate of heat transfer between the fluidised particulate material and the hot sheet immersed in it, and on the rapid transfer of hot particles away from the vicinity of the glass sheet with a concurrent rapid supply of cooler particles from the body of the fluidised bed into the vicinity of the glass sheet.

The movement of particles in the vicinity of the glass surfaces is more rapid than the movement of the particles in the bulk of the bed, because of rapid agitation of the fluidised particulate material which is engendered on the hot immersed surfaces of the glass due to heating of the particulate material by the glass which continues as the glass cools in the fluidised bed.

As described in our co-pending U.S. patent application Ser. No. 934,728, entitled "Thermal Toughening of Glass", agitation of the particulate material at the glass surfaces is considerably enhanced when using a selected particulate material which has latent gas-evolution properties such that there is a rapid evolution of gas from the particulate material when heated in proximity to the glass surfaces.

It has now been found that there are three factors which dominate in controlling the thermal toughening of glass in a gas-fluidised particulate material, and in particular which control the degree of toughening of a hot glass sheet when contacted with a gas-fluidised particulate material.

These factors are as follows:
1. The gas-generating properties of the particulate material.
2. The thermal capacity per unit volume of the particulate material at minimum fluidisation. This is derived from the specific heat of the material measured at 50° C. and the density of the material of the bed measured at minimum fluidisation of the material.
3. The "flowability" of the particulate material, as defined below, which is the sum of four point scores which are awarded to the material by assessment of four characteristics of the flowable particulate material. The term "flowability" when used herein has that meaning.

These four characteristics of a flowable particulate material and the manner of awarding point scores are described in the article "Evaluating Flow Properties of Solids" by Ralph L. Carr Jr., Chemical Engineering Volume 72, Number 2, Jan. 18, 1965, and are as follows:
1. Compressibility $= 100 \ (P-A)/P\%$ where
   P = packed bulk density and
   A = aerated bulk density
2. Angle of Repose: this is the angle in degrees between the horizontal and the slope of a heap of the particulate material dropped from a point above the horizontal until a constant angle is measured.
3. Angle of Spatula: a spatula is inserted horizontally into the bottom of a mass of the dry particulate material and is lifted straight up and out of the material. An average value of the angle in degrees to the horizontal of the side of the heap of material on the spatula is the Angle of Spatula.
4. Particle Size Distribution (called Uniformity Coefficient in the above mentioned article): this is described in the above mentioned article as the numerical value arrived at by dividing the width of sieve opening (i.e. particle size) which will pass 60% of the particulate material by the width of sieve opening which will just pass 10% of the particulate material.

All the values of particle size distribution referred to herein were measured in known manner by a method using a Coulter counter to determine the particle diameters appropriate to retained cumulative weight percentages of 40% and 90% corresponding to widths of sieve openings which will pass 60% and will just pass 10% of the particulate material.

The numerical values of Compressibility, Angle of Repose, and Angle of Spatula were measured using a Hosakawa Powder Tester manufactured by the Hosakawa Micrometrics Laboratory, of The Hosakawa Iron Works, Osaka, Japan, which Powder Tester is specifically designed for use in the determination of the "flowability" of powders as defined above.

It will be appreciated that the flowability of a particulate material is basically related to factors such as the mean particle size, the particle size distribution, and the shape of the particles which is sometimes referred to as the angularity of the particles, that is whether they have a rounded or angular shape. The value of flowability increases with increase of the mean particle size, with decrease of the particle size distribution, and with decrease in the angularity of the particles.

It will also be appreciated that the thermal capacity per unit volume at minimum fluidisation is dependent on the specific heat of the material and on the density of the fluidised bed at minimum fluidisation, which density increases with decrease of the particle size distribution.

A high value of toughening stress is produced in glass when it is quenched in a fluidised bed having an optimum flowability. Some materials which produce required toughening stresses may be directly selected from those which are commercially available. Other commercially available materials may be modified to produce the required toughening stresses by sieving the material to change its mean particle size and particle size distribution.

A problem exists however in that materials having the required flowability may not be commercially available, and there is a limit to the extent to which the degree of toughening stress induced in glass can be controlled by variation of the flowability of commercially available materials. The production of a large quantity of a material having the required flowability may involve the sieving of a large quantity of particulate material. In addition when using a single material the modification of the thermal capacity of the fluidised bed is accomplished by narrowing the particle size distribution. This modification of the thermal capacity in turn affects the variation of flowability which is produced by narrowing the particle size distribution.

It has now been found that a particulate material can be produced having optimum gas-generating properties, thermal capacity and flowability for the production of required toughening stresses in a glass article by use of a mixture of particulate materials each of which contributes to optimum properties of the mixture. By selection of particulate materials and the proportions in which they are mixed the gas-fluidised particulate material can be tailored to provide any required toughening stresses within a wide range.

SUMMARY

According to the invention there is provided a method of thermally treating glass comprising heating the glass to a predetermined temperature, contacting the hot glass with a gas-fluidised particulate material which comprises a mixture of a number of selected particulate materials, at least one of said particulate materials having gas-generating properties when heated by said hot glass, and mixing said materials in selected predetermined proportions which impart to the mixture of particulate materials a thermal capacity, determined as the thermal capacity per unit volume at minimum fluidisation, and a flowability such that a required thermal treatment of the glass by the gas-fluidised mixture is achieved.

The invention further provides a method of thermally toughening a glass sheet comprising heating the glass sheet to a temperature above its strain point, contacting the hot glass sheet with a gas-fluidised particulate material which comprises a mixture of a number of selected particulate materials, at least one of said particulate materials having gas-generating properties when heated by said hot glass sheet, and mixing said materials in selected predetermined proportions which impart to the mixture of particulate materials a thermal capacity, determined as the thermal capacity per unit volume at minimum fluidisation, and a flowability such that required toughening stresses are induced in the glass as it cools in said gas-fluidised particulate material.

The invention further provides a method of thermally toughening a glass sheet comprising, heating the glass to a temperature above its strain point, chilling the hot glass by contact with a gas-fluidised particulate material which comprises a mixture in predetermined proportions of a number of particulate materials, at least one of which has gas-generating properties, selecting as the gas-generating particulate material a material which is capable of evolving from 4% to 37% of its own weight of gas when heated to a constant weight at 800° C., and mixing said particulate materials in predetermined proportions which impart to the mixture a thermal capacity per unit volume at minimum fluidisation in the range 1.02 to 1.73 MJ/m$^3$K and a flowability in the range 60 to 86.

The invention also comprehends a method of thermally toughening glass comprising, heating the glass to a temperature above its strain point, chilling the hot glass in a gas-fluidised particulate material which is maintained in a quiescent uniformly expanded state of particulate fluidisation, which particulate material comprises a mixture in predetermined proportions of a number of particulate materials at least one of which has gas-generating properties, selecting as the gas-generating particulate material a material which is capable of evolving gas when that material contacts the hot glass, and mixing said particulate materials in predetermined proportions which impart to the mixture a thermal capacity per unit volume at minimum fluidisation in the range 1.02 to 1.73 MJ/m$^3$K and a flowability in the range 60 to 86.

For thermally toughening a sheet of soda-lime-silica glass the sheet is preferably heated to a temperature in the range 610° C. to 680° C.

The proportions of the particulate materials in the mixture may be such that the mixture has a thermal capacity per unit volume at minimum fluidisation in the range 1.02 to 1.73 MJ/m$^3$K and a flowability in the range 70 to 84.

When thermally toughening a sheet of soda-lime-silica glass of thickness in the range 2 mm to 2.5 mm by the method of the invention, the glass is heated to a temperature in the range 610° C. to 680° C. and a central tensile stress in the range 35 to 57 MPa is engendered in the glass when it is quenched in the gas-fluidised mixture of particulate materials which is maintained in a quiescent uniformly expanded state of particulate fluidisation.

The gas-generating particulate material may be γ-alumina; aluminium trihydrate (Al$_2$O$_3$.3H$_2$O); aluminium monohydrate (Al$_2$O$_3$.1H$_2$O); aluminosilicate; or sodium bicarbonate (NaHCO$_3$).

The mixture may comprise γ-alumina mixed with α-alumina, preferably from 7% to 86% by weight of γ-alumina and from 93% to 14% by weight of α-alumina.

Two gas-generating particulate materials may be mixed to produce the mixture, for example aluminium trihydrate and γ-alumina in equal proportions.

The mixture may comprise from 8% to 10% by weight of aluminosilicate mixed with from 92% to 90% by weight of α-alumina. The aluminosilicate may be zeolite.

The mixture may comprise from 17% to 20% by weight of aluminium monohydrate mixed with from 83% to 80% by weight of α-alumina; or 10% by weight of sodium bicarbonate mixed with 90% by weight of α-alumina.

Silicon carbide may be mixed with a gas-generating particulate material in predetermined proportions to constitute the mixture. The mixture may comprise from 17% to 20% by weight of aluminium monohydrate mixed with from 83% to 80% by weight of silicon carbide.

The invention also comprehends a method of thermally toughening glass comprising heating the glass to a temperature above its strain point; chilling the hot glass in a gas-fluidised particulate material which comprises a mixture in predetermined proportions of a gas-generating particulate material and at least one particulate metal oxide whose thermal capacity per unit volume at minimum fluidisation is in the range of about 1.76 or 1.77 to 2.01 $MJ/m^3K$, selecting as the gas-generating particulate material a material which is capable of evolving from 4% to 37% of its own weight of gas when heated to a constant weight at 800° C., and mixing said particulate materials in predetermined proportions which impart to the mixture a thermal capacity per unit volume at minimum fluidisation in the range 1.27 to 1.76 $MJ/m^3K$, more particularly 1.50 to 1.73 $MJ/m^3K$ and a flowability in the range 73 to 78.

The particulate metal oxide may be spheroidal iron oxide ($\alpha$-$Fe_2O_3$); or zircon ($ZrO_2.SiO_2$).

The mixture may comprise from 35% to 70% by weight of spheroidal iron oxide. In one embodiment the mixture comprises 70% by weight of spheroidal iron oxide and 30% by weight of $\gamma$-alumina as gas-generating material. In another embodiment the mixture comprises 35% by weight of spheroidal iron oxide, 45% by weight of $\alpha$-alumina, and 20% by weight of $\gamma$-alumina as gas-generating material. The mixture may comprise 20% by weight of aluminium monohydrate and 80% by weight of zircon.

BRIEF DESCRIPTION OF THE DRAWINGS

Some embodiments will now be described, by way of example, with reference to the accompanying drawings in which:

FIGS. 9, 10 and 11 illustrate the variation of central tensile stress with composition of the mixture of particulate materials in three other ways of carrying out the method of the invention.

DESCRIPTION OF THE PREFERRED EMBODIMENTS

Figure 1:
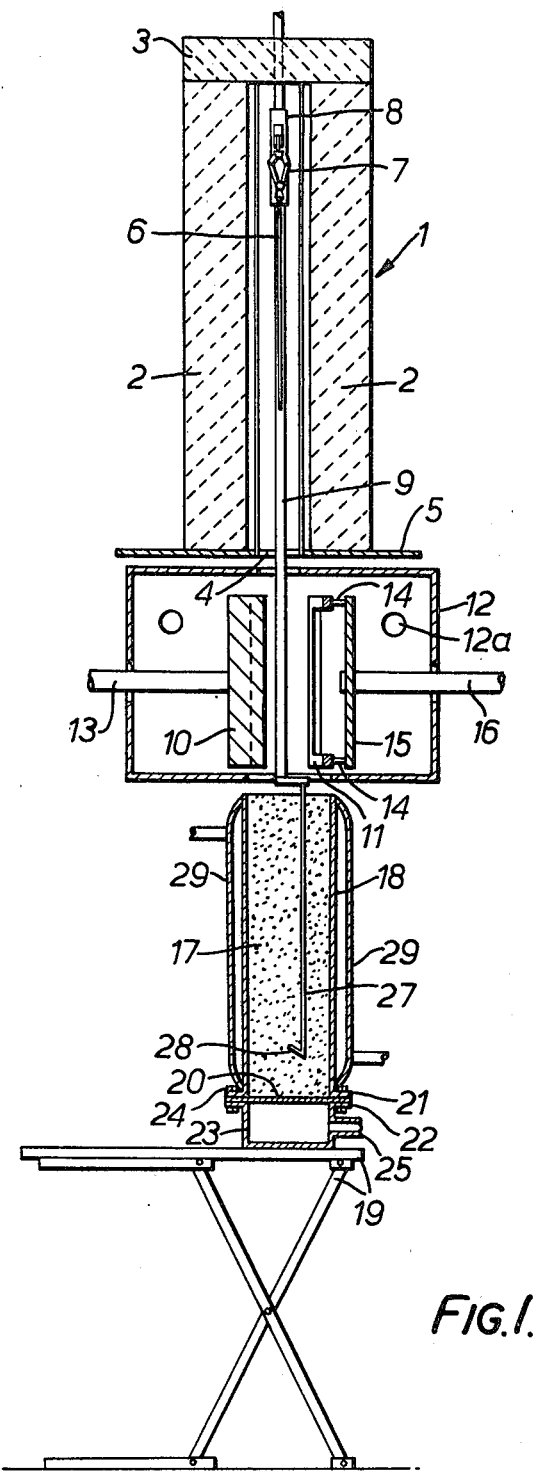
FIG. 1 illustrates diagrammatically a vertical section through apparatus for thermally toughening glass sheets by the method of the invention.

Referring to FIG. 1 of the drawings, a vertical toughening oven indicated generally at 1 has side walls 2 and a roof 3. The side walls 2 and the roof 3 are made of the usual refractory material and the bottom of the oven has an open mouth defined by an elongated aperture 4 in a base plate 5 on which the oven 1 is supported. A slidable shutter, not shown, is provided to close the mouth 4 in known manner. A sheet of glass to be curved and subsequently thermally toughened is suspended in the oven 1 by tongs 7 which grip the upper margin of the glass sheet 6. The tongs 7 are suspended from a tong bar 8 which is suspended from a conventional hoist, not shown, and which runs on vertical guides 9 which extend downwardly from the oven to guide the lowering and raising of the tong bar.

A pair of bending dies 10 and 11 are located immediately below the mouth 4 of the oven in a heated chamber 12 which is maintained at a temperature such that the dies are at the same temperature as the hot glass which they bend. The chamber 12 is heated by hot gases fed through ports 12a. When the dies are open they are located on either side of the path of the glass sheet 6. The die 10 is a solid male die mounted on a ram 13 and has a curved front face which defines the curvature to be imposed on the hot glass sheet. The die 11 is a ring frame female die carried by struts 14 mounted on a backing plate 15 which is mounted on a ram 16. The curvature of the die frame 11 matches the curvature of the face of the male die 10.

The guide rails 9 extend downwardly to either side of the bending dies towards a container for a fluidised bed 17 of particulate refractory material in which the hot curved glass sheet is to be chilled by lowering the sheet downwardly into the bed.

The container for the fluidised bed comprises an open-topped rectangular tank 18 which is mounted on a scissors-lift platform 19. When the platform 19 is in its raised position the top edge of the tank 18 is just below the bending dies 10 and 11.

A high pressure drop micro-porous membrane 20 extends across the base of the tank 18.

The edges of the membrane 20 are fixed between a flange 21 on the tank and a flange 22 on a plenum chamber 23 which forms the base of the tank. The flanges and the edges of the membrane 20 are bolted together as indicated at 24. A gas inlet duct 25 is connected to the plenum chamber and fluidising air is supplied to the duct at a regulated high pressure. There is a high pressure drop of at least 60% of the plenum pressure across the membrane 20 which results in a uniform distribution of fluidising air in the particulate material at a gas flow velocity through the particulate material between that velocity corresponding to minimum fluidisation with the particles just suspended in the upwardly flowing air, and that velocity corresponding to maximum expansion of the particulate material in which dense-phase fluidisation is maintained. The expanded bed is in a substantially bubble-free quiescent state of particulate fluidisation with a horizontal quiescent surface through which the glass sheet enters the bed.

The membrane 20 may comprise a steel plate which has a regular distribution of holes and a number of layers of strong micro-porous paper laid on the plate. For example fifteen sheets of paper may be used. The membrane is completed with a woven wire mesh laid on top of the layers of paper, for example stainless steel mesh.

A basket for catching cullet may be located near the membrane 20 and is designed so as not to interfere with the uniform flow of fluidising gas upwardly from the membrane.

The guide rails 9 extend downwardly to a position below the bending dies and terminate in the region of the upper edge of the tank. A fixed frame 27 is mounted in the tank 18 and has upturned feet 28 at its base to receive the lower edge of a glass sheet immersed in the fluidised bed when the tong bar is lowered beyond the bending dies by the hoist.

In order to load a glass sheet into the apparatus the scissors-lift table 19 is lowered and with the tong bar in its lowest position at the bottom of the guide rails the glass sheet to be cured and toughened is loaded onto the tongs 7.

The hoist then raises the suspended glass sheet into the oven 1 which is maintained at a temperature for example 850° C. so that the glass sheet is rapidly heated to a temperature near its strain point for example in the range 610° C. to 680° C. When the glass sheet has reached the required temperature uniformly, the shutter closing the mouth 4 is opened and a hot glass sheet is lowered by the hoist into position between the open bending dies 10 and 11. The rams 13 and 16 are operated and the dies close to bend the sheet to a desired curvature. When the required curvature has been imparted to the sheet, for example to enable the sheet to be used as a component of a laminated windscreen for a motor vehicle, the dies open and the hot curved glass sheet is rapidly lowered into the fluidised bed in the tank 18 which has been raised to quenching position by raising the scissors-lift table 19 while the glass sheet was being heated in the oven 1. The fluidised bed is maintained at a temperature of between 30° C. and 150° C. by a water cooling jacket fixed to the flat longer walls of the tank 18.

The fluidised bed 17 is constituted by gas-fluidised particulate material which is a mixture in predetermined proportions of a number of particulate materials one at least of which has gas-generating properties and is capable of evolving gas when the fluidised material contacts the hot glass.

A suitable gas-generating particulate material is capable of evolving from 4.0% to 37% of its own weight of gas when heated to constant weight at 800° C. Suitable materials are $\gamma$-alumina ($\gamma$-Al$_2$O$_3$) which is porous and contains water adsorbed in its pores; aluminosilicates which are porous and contain water absorbed in their pores; alumina hydrates such aluminium trihydrate (Al$_2$O$_3$.3H$_2$O) containing combined water of crystallization, and aluminium monohydrate (Al$_2$O$_3$.1H$_2$O) containing water of crystallization and which is porous with water also adsorbed in the pores; and materials which generate gases other than water, for example sodium-bicarbonate (NaHCO$_3$).

To produce required toughening stresses in the glass the components of the mixture of particulate materials are mixed in predetermined proportions which impart to the mixture a flowability in the range 60 to 86 and a thermal capacity per unit volume at minimum fluidisation in the range 1.02 to 1.75 MJ/m$^3$K.

Other components of the mixture which are mixed with the gas-generating particulate material are particulate materials which are inert in the sense that substantially no gas is evolved from the material when heated. Examples are $\alpha$-alumina ($\alpha$-Al$_2$O$_3$); zircon (ZrO$_2$.SiO$_2$); silicon carbide; and spheroidal iron oxide ($\alpha$-Fe$_2$O$_3$).

These particulate materials are of dense non-porous form and are selected to have a flowability and thermal capacity different from the gas-generating particulate material so that, depending on the proportion of the dense non-porous material employed, they are effective to modify the flowability and thermal capacity of the mixture of particulate materials to an extent such that a required degree of toughening stress is produced in the glass.

It is thought that when a hot glass sheet is quenched in a gas-fluidised bed of such a mixture of particulate materials, rapid evolution and expansion of the gas evolved from the gas-generating particulate material due to heating of the particulate material in the vicinity of the glass surfaces enhance the localised agitation of the mixture of particulate materials on the glass surfaces in a manner akin to the boiling of a liquid, with the result that there are agitated layers of gas and particulate material streaming over the glass surfaces as the glass is chilled in the fluidised bed.

By the blending of the components of the mixture in predetermined proportions, there is optimum heat transfer away from the glass surfaces into the bulk of the bed which induces the stresses desired to be introduced into the glass, and there is continual dissipation to the remoter parts of the bed of the heat which is extracted from the glass by the agitation of the fluidised particulate material immediately surrounding the glass sheet.

The water cooled jacket 29 keeps the remoter parts of the bed cool so that they act in effect as a heat sink. Severe agitation of the particulate material on the glass surfaces continues until well after the glass has cooled below its strain point, which ensures that the centre-to-surface temperature gradients initially induced in the glass as the glass is in the fluidised bed, are maintained as the glass cools through its strain point, and the required toughening stresses are developed thereafter during the continuous cooling of the glass while it is still immersed in the bed.

The lower edge of the hot glass sheet is uniformly chilled as the lower edge enters the horizontal quiescent surface of the expanded fluidised bed. Substantially the same tensile stresses are generated in different areas of the surface of the edge of the glass sheet so that there is a very low incidence of fracture. During the descent of the lower edge of the glass into the bed, every part of the lower edge always contacts fluidised material which is in a quiescent uniformly expanded state of particulate fluidisation, and this uniform treatment of the lower edge, regardless of streaming flow of particulate material which may be generated on the hot glass surfaces by gas evolution from the gas-generating component of the blend, largely obviates fracture and the consequent problems of dealing with glass fragments in the bed. This together with the avoidance of losses of glass sheets due to change of shape of the glass sheets and/or damage to the surface quality, ensures a commercially viable yield of toughened glass sheets.

Some examples of operation of the invention with selected blends of particulate material are given below. In each of these examples the numerical value of the product of the particle density, in g/cm$^3$, and the mean particle size in $\mu$m of each of the components of the mixture is less than 220. This is a criterion which has been useful for assessing whether an individual particulate material is suitable for fluidisation in a quiescent uniformly expanded state of particulate fluidisation, when operating with air at ambient conditions of normal temperature and pressure. A mixture of the individual particulate materials is then capable of being fluidised in a quiescent uniformly expanded state of particulate fluidisation.

EXAMPLE 1

The fluidised bed 17 was constituted by a mixture of γ-alumina as gas-generating particulate material, and α-alumina.

The γ-alumina used was a microporous material having pores of size in the range 2.7 to 4.9 nm and having from 20% to 40% of free pore space. The pores contain adsorbed water which is released as gas when the material is heated.

The γ-alumina used had the following characteristics:

| | |
|---|---|
| mean particle size | = 64 μm |
| particle size distribution | = 1.88 |
| flowability | = 84 |
| water content (weight loss at 800° C.) | = 4% |
| thermal capacity per unit volume at minimum fluidisation | = 1.06 MJ/m³K |

The α-alumina used as a dense non-porous form having the following properties:

| | |
|---|---|
| mean particle size | = 30 μm |
| particle size distribution | = 1.22 |
| flowability | = 70 |
| thermal capacity per unit volume at minimum fluidisation | = 1.3 MJ/m³K |

Experiments were conducted with mixtures of the γ-alumina and α-alumina which were blended together in predetermined proportions from 100% γ-alumina and 0% α-alumina to 0% γ-alumina and 100% α-alumina.

Table I sets out the thermal capacity per unit volume at minimum fluidisation and the flowability of the mixtures used:

TABLE I

| Mixture Weight % | | Thermal Capacity | |
|---|---|---|---|
| γ-Alumina | α-Alumina | MJ/m³K | Flowability |
| 100 | 0 | 1.05 | 84 |
| 86 | 14 | 1.09 | 82.75 |
| 61 | 39 | 1.15 | 79 |
| 40 | 60 | 1.20 | 76 |
| 22 | 78 | 1.25 | 73.25 |
| 7 | 93 | 1.29 | 71 |
| 0 | 100 | 1.30 | 70 |

Figure 2:
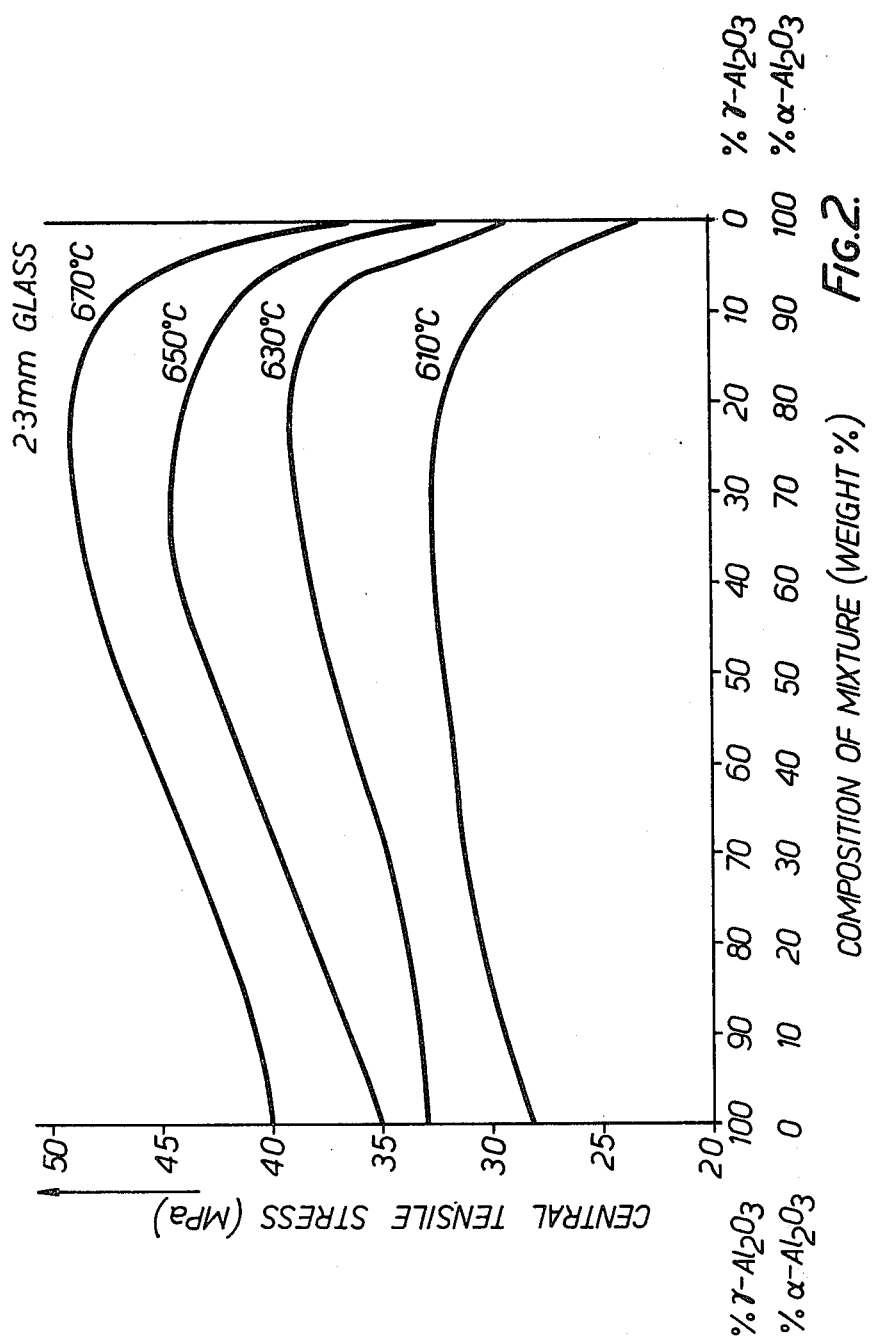
FIG. 2 is a graph of central tensile stress plotted against the proportions of the mixture of particulate materials constituting the gas-fluidised bed and illustrating variation of stress with variation of those proportions when toughening 2.3 mm glass.
Figure 3:
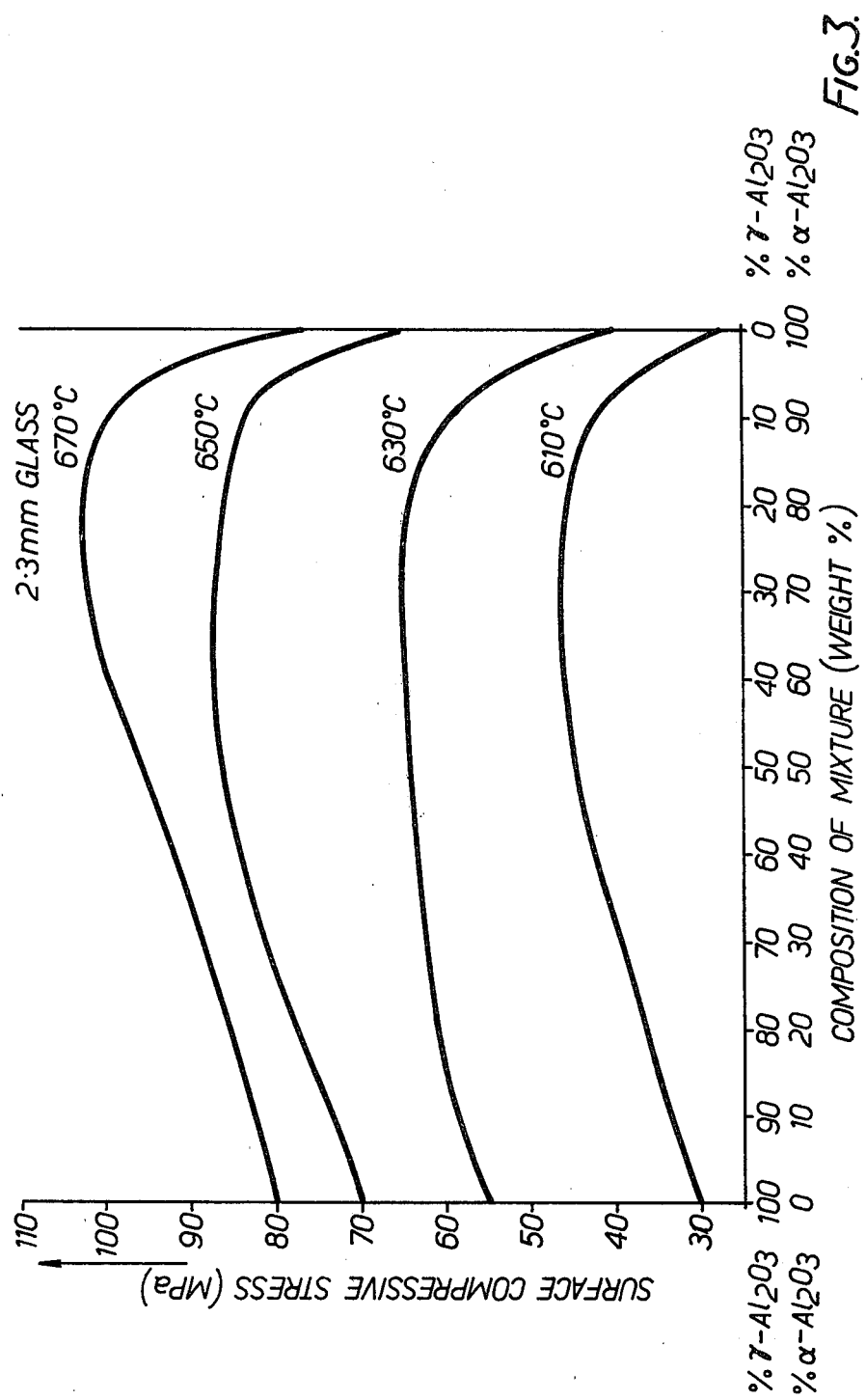
FIG. 3 is a graph similar to FIG. 2 illustrating the variation of surface compressive stress in 2.3 mm glass with variation in the composition of the gas-fluidised bed.

Sheets of glass of soda-lime-silica composition, 2.3 mm thick, were cut, and the edges of the cut sheets were finished by being rounded using a fine diamond grit wheel. Each sheet was suspended by the tongs 7 and was heated in the furnace 1 before being bent and quenched. The results are illustrated in FIGS. 2 and 3. The abscissa of each curve represents the composition of the blend in weight %. In each of FIGS. 2 and 3 there are four curves corresponding to the central tensile stress (FIG. 2) and to the surface compressive stress (FIG. 3) induced in the 2.3 mm thick glass sheets which have heated to a temperature of 610° C., 630° C., 650° C. or 670° C., and then quenched in the fluidised bed 17 which was maintained in a quiescent uniformly expanded state of particulate fluidisation and in the temperature range 60° C. to 80° C.

The curves show that it was preferable to use from about 7% to about 86% by weight of α-alumina mixed with γ-alumina. As the proportions of α-alumina in the misture is increased, the central tensile stress and the surface compressive stress induced in the glass in the thermal toughening process increases up to a maximum which is achieved when the amount of α-alumina is about 70% to 80% by weight of the mixture. Generally the highest stresses were induced when the amount of α-alumina present is from 55% to 85% by weight of the mixture. A higher proportion of α-alumina in the mixture produces a falling off in the induced stresses.

By suitable selection of the proportions of γ-alumina and α-alumina, the mixture had gas-generating properties, a thermal capacity per unit volume at minimum fluidisation at 50° C., and flowability, which produced consistently high values of central tensile stress and surface compressive stress in the sheets of glass 2.3mm thick.

For example, when the glass is heated to 670° C. and then quenched, a required central tensile stress, in the range 42 MPa to 49 MPa, and corresponding surface compressive stress, in the range 83 MPa to 103 MPa, can be induced in the glass by selecting the predetermined proportions of γ-alumina and α-alumina in the mixture in the range from 7% to 86% by weight of γ-alumina and from 93% to 14% by weight of α-alumina.

EXAMPLE 2

Figure 4:
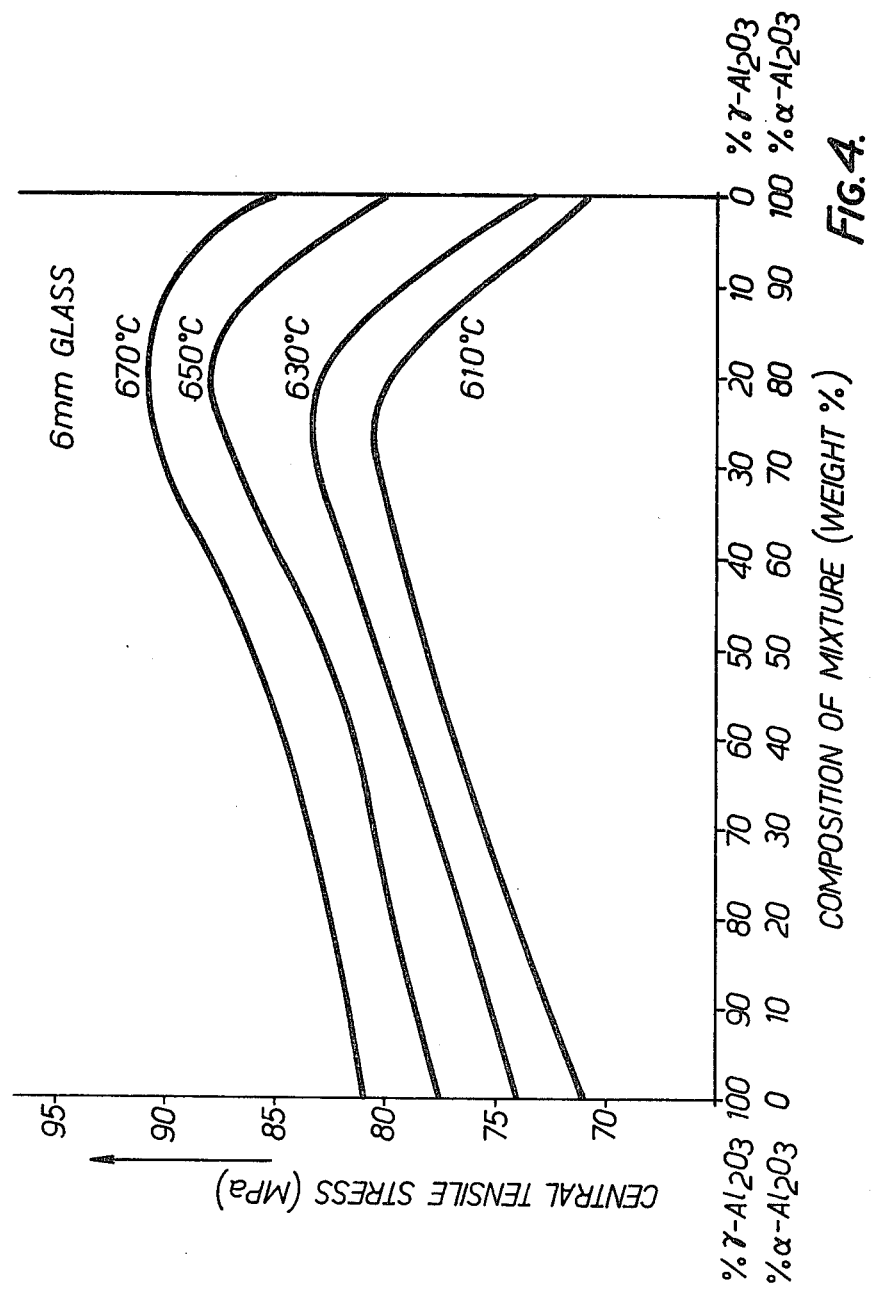
FIG. 4 is a graph similar to FIG. 2 illustrating central tensile stress as induced in glass 6 mm thick.
Figure 5:
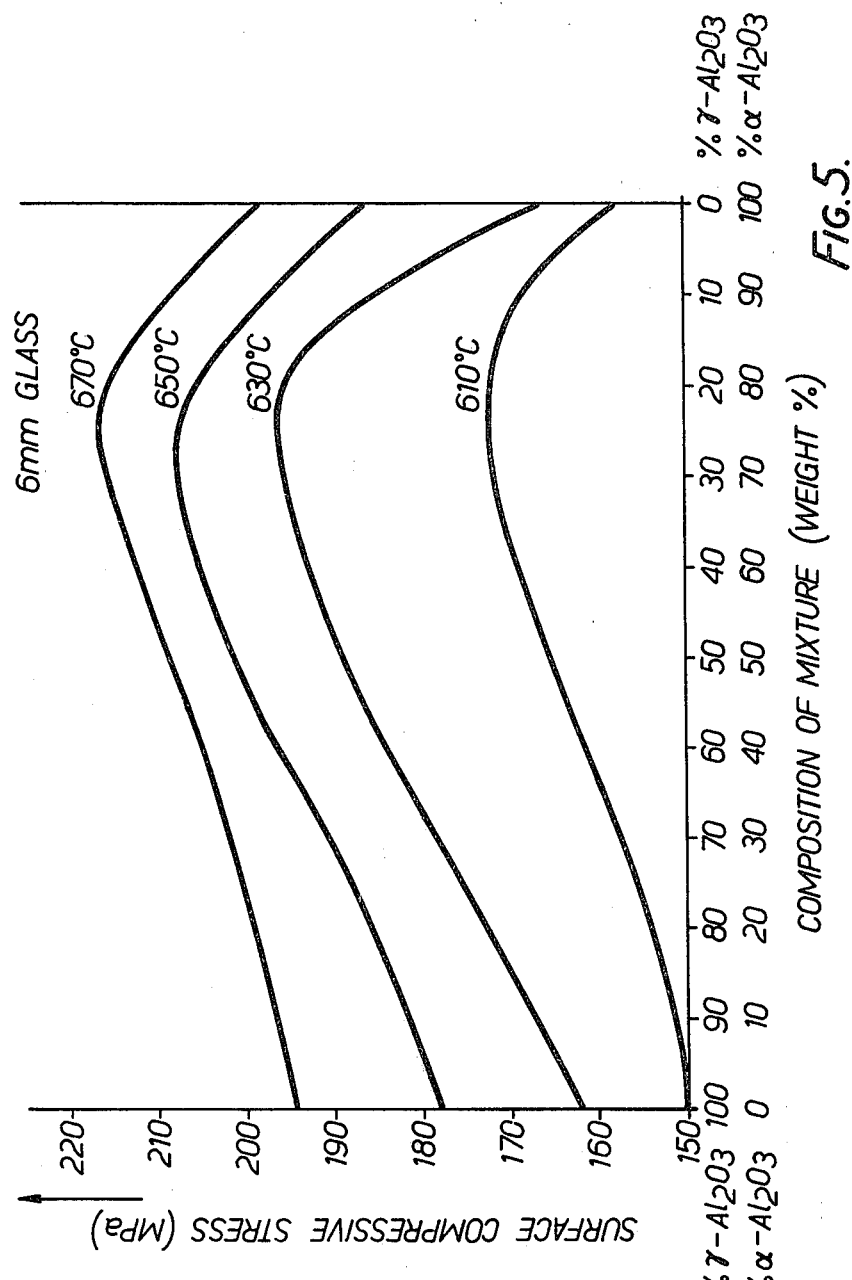
FIG. 5 is a graph similar to FIG. 3 illustrating variation of surface compressive stress induced in glass 6 mm thick.

Sheets of soda-lime-silica glass 6 mm thick were cut and edge finished and were then heated and quenched in a fluidised bed in a quiescent uniformly expanded state of particulate fluidisation constituted by a blend of the same particulate γ-alumina and α-alumina materials as described in Example 1. FIGS. 4 and 5 are graphs similar to FIGS. 2 and 3, which illustrate the results obtained for glass sheets heated to temperatures of 610° C., 630° C., 650° C. and 670° C. and then quenched.

The results show that required toughening stresses can be induced in the glass which are a function of the proportions of γ-alumina and α-alumina in the mixture. Maximum stresses were achieved when the mixture comprised about 65% to 95% by weight of α-alumina. For example when the glass was heated to 670° C. and then quenched in a fluidised mixture of 22% by weight of γ-alumina and 78% by weight of α-alumina, the central tensile stress induced in the glass was 91 MPa and the surface compressive stress was 216 MPa.

This high strength 6 mm thick glass is used in the manufacture of window assemblies for aircraft and railway locomotives.

Similar results were obtained when toughening sheets of soda-lime-silica glass 10 mm thick. Such glass sheets are used in the manufacture of window assemblies for aircraft which may for example comprise two sheets of toughened glass 10 mm thick and an outer sheet 3 mm thick. The sheets are laminated together with plastic interlayers of known kind.

EXAMPLE 3

Sheets of soda-lime-silica glass 12 mm thick were cut and edge finished, and then were heated and quenched in a fluidised bed constituted by a mixture of γ-alumina and α-alumina in predetermined proportions in the same way as described in Example 1.

Figure 6:
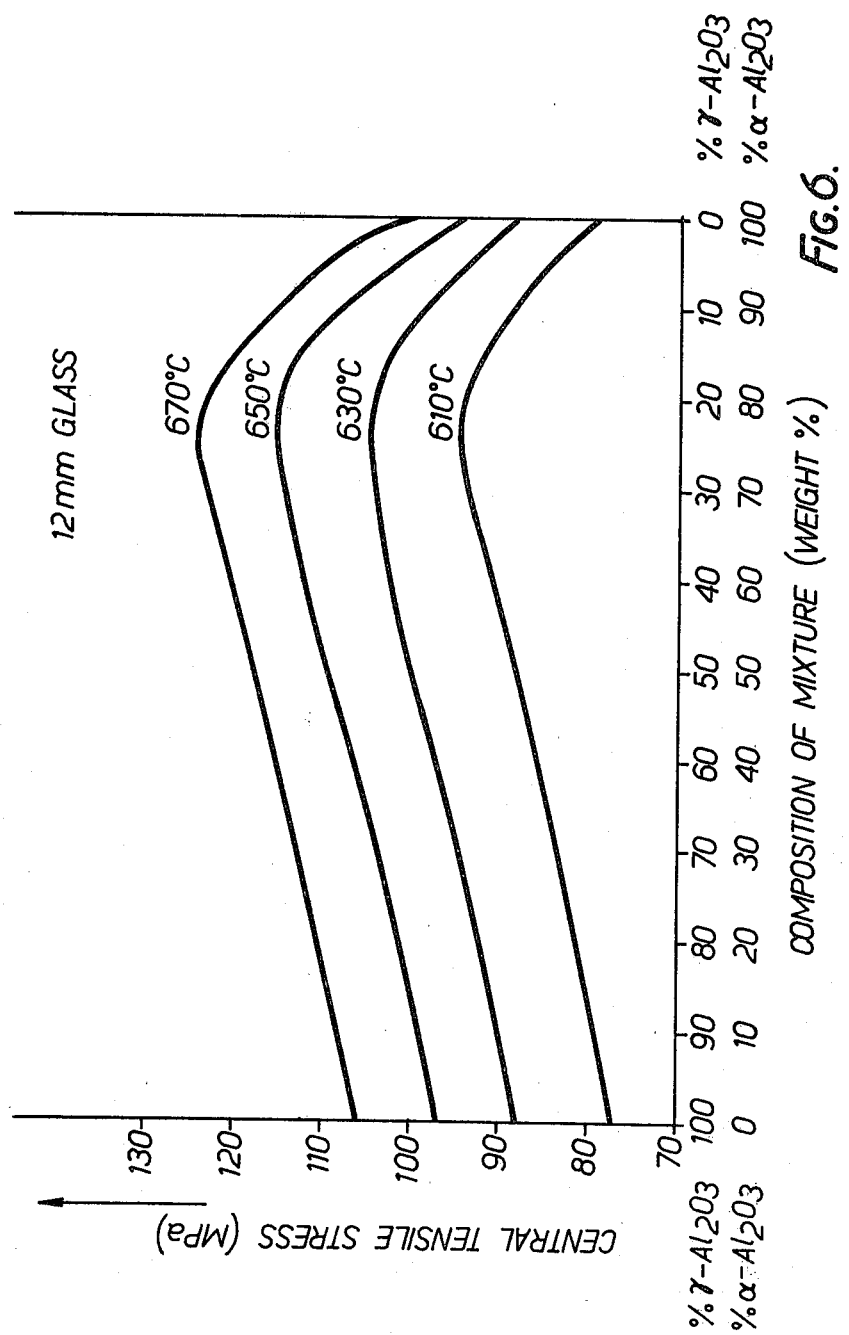
FIG. 6 is a graph similar to FIG. 2 for 12 mm glass.
Figure 7:
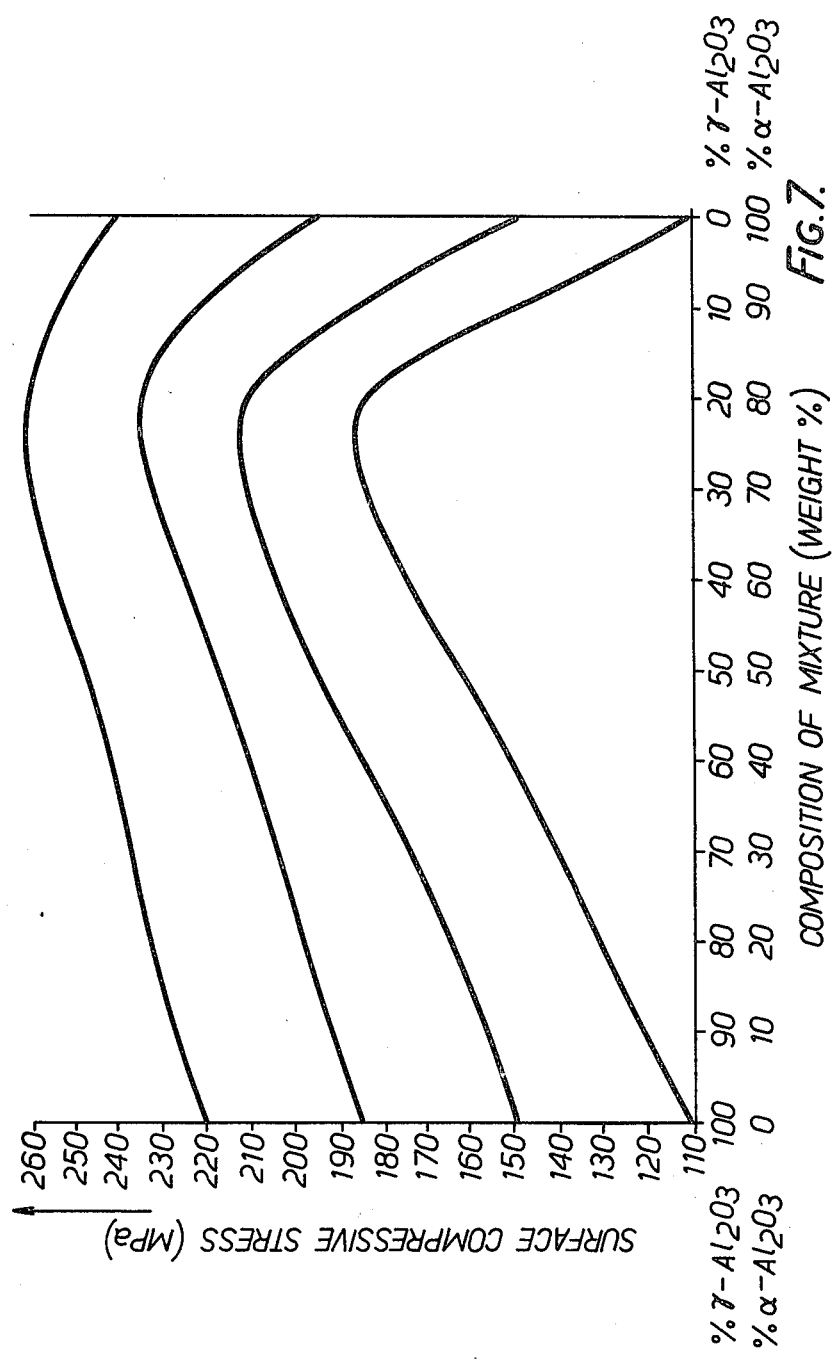
FIG. 7 is a graph similar to FIG. 3 for 12 mm glass.

Results were obtained for glass sheets heated to 610° C., 630° C., 650° C. and 670° C. with a range of proportions of γ-alumina and α-alumina, and the results are illustrated by the curves of FIGS. 6 and 7.

Maximum values of stress were measured when the fluidised mixture comprises about 65% to 85% by weight of α-alumina. When a sheet was heated to 670° C. and quenched in a fluidised bed of a mixture of 22% by weight of γ-alumina and 78% by weight of α-alumina, the central tensile stress in the gas was 124 MPa and the surface compressive stress was 261 MPa.

FIGS. 6 and 7 illustrate how a wide range of values of toughening stresses can be induced in the glass, as required, by selection of the proportions of the constituents of the mixture of particulate materials as appropriate to the temperature to which the glass is heated before quenching.

The results illustrated in FIGS. 2 to 7 have in common that higher toughening stresses are achieved as the proportion in the mixture of the constituent of higher thermal capacity (α-alumina) is increased up to a point where further increase in the proportion reduces the proportion of gas-generating constituent (γ-alumina) to an inadequate level.

The range of proportions of the gas-generating material and the other constituent or constituents of the mixture ensure a flowability of the mixture in the range 60 to 86 which is such that the nature of the agitation is favourable for cooling the glass at a rate which achieves the required values of stress in the glass.

Cooling of the glass occurs due to the rapid agitation of the particulate material in the vicinity of the glass surface, which agitation is substantially due to the evolution of water vapour from the γ-alumina constituent of the mixture.

A higher proportion of α-alumina enhances the rate of heat extraction from the glass as well as modifying the flowability of the mixture.

EXAMPLE 4

Sheets of 2.3 mm thick soda-lime-silica glass were cut and edge finished in the same way as in Example 1, then heated to 660° C. and quenched in a fluidised mixture of the same α-alumina as in Example 1 to 3 and γ-alumina having characteristics:

| | |
|---|---|
| mean particle size | = 119 μm |
| particle size distribution | = 2.34 |
| flowability | = 90.25 |
| water content (weight loss at 800° C.) | = 4.3% |
| thermal capacity per unit volume at minimum fluidisation | = 1.09 MJ/m$^3$K |

Table II sets out the characteristics of different mixtures of these materials in the range 30% to 90% by weight of α-alumina and 70% to 10% by weight of γ-alumina, and also the central tensile stress induced in the glass sheets when quenched. For comparison, the central tensile stress produced when using the α-alumina and γ-alumina alone are also included in Table II.

TABLE II

| | Percentage by weight in mixture | | | | | |
|---|---|---|---|---|---|---|
| α-alumina | 0% | 30% | 50% | 70% | 90% | 100% |
| γ-alumina | 100% | 70% | 50% | 30% | 10% | 0% |
| flowability of mixture | 90.25 | 81.5 | 75 | 74 | 72.25 | 70 |
| thermal capacity of mixture per unit volume at minimum fluidisation (MJ/m$^3$K) | 1.09 | 1.16 | 1.20 | 1.24 | 1.28 | 1.3 |
| Central tensile stress (MPa) | 41 | 43 | 49 | 49 | 47 | 32 |

Figure 8:
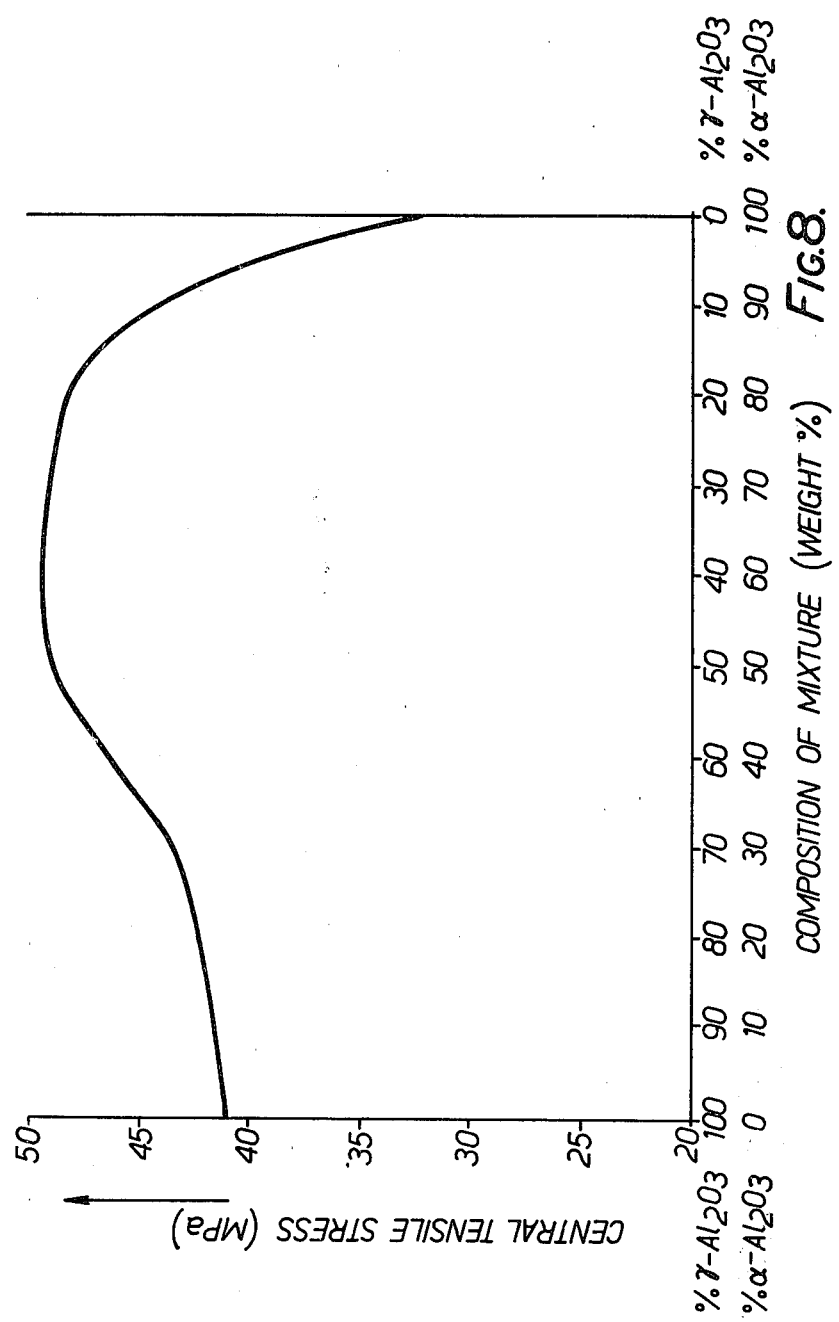
FIG. 8 is a graph similar to FIG. 2 illustrating variation in central tensile stress with variations of the proportions in another mixture of particulate materials.

FIG. 8 illustrates the variation of central tensile stress with composition of the mixture.

The γ-alumina alone has a flowability which is too high for the production of maximum toughening stress in the glass sheets due particularly to its large mean particle size and the fact that the particles are of relatively smooth non-angular shape. The addition of a proportion of α-alumina, which has a lower flowability than the γ-alumina because of the smaller mean particle size of the α-alumina and the angularity of its individual particles lowers the flowability of the mixture. The flowability of the mixture decreases as the amount of α-alumina in the mixture is increased, and there is a commensurate increase in the central tensile stress produced. A maximum central tensile stress of 49 MPa is achieved when the flowability has been adjusted to the optimum value of 74, and the mixture contains about 70% by weight of α-alumina and 30% by weight of γ-alumina.

The α-alumina has a higher thermal capacity than the γ-alumina, and as the proportion of α-alumina in the mixture is increased there is a progressive increase in the thermal capacity of the mixture which contributes to the increase in stress which is achieved.

Further addition of α-alumina in a proportion above 70% by weight increases the thermal capacity slightly more and maintains a reasonable flowability, but decreases the central tensile stress induced, probably because the proportion of the gas-generating constituent, γ-alumina, has been reduced to a lower level.

The following examples each relate to the toughening of sheets of soda-lime-silica glass which are 2.3 mm thick. In each example the proportions of the components of the fluidised mixture of particulate materials, which was in a quiescent uniformly expanded state of particulate fluidisation, were selected to induce required toughening stresses in the glass. Correspondingly higher stresses were induced in thicker glass.

EXAMPLE 5

The fluidised bed was constituted by a mixture of 9% by weight of zeolite, which is a porous, crystalline aluminosilicate having water adsorbed in its pores, and 91% by weight of α-alumina.

The zeolite had the following characteristics:

| | |
|---|---|
| mean particle size | = 24 μm |
| particle size distribution | = 4 |
| flowability | = 51 |
| water content (weight loss at 800° C.) | = 20% |
| thermal capacity per unit volume at minimum fluidi- | |

-continued

| sation | = 0.8 MJ/m³K |
|---|---|

The α-alumina had the following characteristics:

| mean particle size | = 37 μm |
|---|---|
| particle size distribution | = 1.682 |
| flowability | = 70 |
| thermal capacity per unit volume at minimum fluidisation | = 1.4 MJ/m³K |

The thermal capacity per unit volume at minimum fluidisation of the mixture was 1.34 MJ/m³K and the flowability of the mixture was 60.

A glass sheet 2.3 mm thick was heated to 660° C. and quenched in the fluidised mixture, and produced a central tensile stress of 41 MPa in the sheet. By varying the selected proportions of the constituents of the mixture a central tensile stress within the range 25 MPa to 41 MPa could be induced in the sheet.

EXAMPLE 6

The fluidised bed was constituted by 20% by weight of γ-alumina and 80% by weight of α-alumina.

The γ-alumina had the following characteristics:

| mean particle size | = 61 μm |
|---|---|
| particle size distribution | = 1.68 |
| flowability | = 88 |
| water content (weight loss at 800° C.) | = 7% |
| thermal capacity per unit volume at minimum fluidisation | = 1.16 MJ/m³K |

The α-alumina had the following characteristics:

| mean particle size | = 22 μm |
|---|---|
| particle size distribution | = 1.69 |
| flowability | = 63 |
| thermal capacity per unit volume at minimum fluidisation | = 1.24 MJ/m³K |

The mixture had a flowability of 66.75 and a thermal capacity per unit volume at minimum fluidisation of 1.22 MJ/m³K.

A glass sheet 2.3 mm thick was heated to 660° C. and induced a central tensile stress of 40.5 MPa in the sheet. By varying the proportions of γ-alumina and α-alumina in the mixture, a predetermined central tensile stress in the range 34 MPa to 40.5 MPa could be induced in the sheet.

EXAMPLE 7

The fluidised bed was constituted by a mixture of α-alumina with equal proportions of each of four γ-aluminas.

The γ-aluminas are designated A, B, C and D in Table III which sets out the characteristics of the γ-aluminas. The weight proportion of the α-alumina and the total weight proportion of the equally proportioned γ-aluminas are given in Table IV.

TABLE III

|  | γ-alumina | | | |
|---|---|---|---|---|
|  | A | B | C | D |
| mean particle size (μm) | 70 | 61 | 57 | 72 |
| particle size distribution | 1.47 | 1.67 | 1.66 | 1.65 |
| flowability | 88.5 | 88 | 85 | 86 |
| water content (% weight loss at 800° C.) | 7 | 7 | 7 | 7 |
| thermal capacity per unit volume at minimum fluidisation (MJ/m³K) | 1.16 | 1.16 | 1.12 | 1.12 |

The characteristics of the α-alumina were as follows:

| mean particle size | = 22 μm |
|---|---|
| particle size distribution | = 1.69 |
| flowability | = 63 |
| thermal capacity per unit volume at minimum fluidisation | = 1.24 MJ/m³K |

Glass sheets of soda-lime-silica composition 2.3 mm thick were heated to 660° C. and quenched in gas-fluidised mixtures of the above materials which were in a quiescent uniformly expanded state of particulate fluidisation.

The characteristics of the mixtures and the resulting central tensile stresses produced in the glass sheet were as given in Table IV.

TABLE IV

|  | Percentage by weight in mixture | | | | |
|---|---|---|---|---|---|
| Mixture of 4 γ-aluminas | 100% | 40% | 20% | 10% | 0% |
| α-alumina | 0% | 60% | 80% | 90% | 100% |
| flowability of mixture | 87 | 70 | 67 | 65 | 63 |
| thermal capacity of mixture per unit volume at minimum fluidisation (MJ/m³K) | 1.14 | 1.20 | 1.22 | 1.23 | 1.24 |
| Central Tensile Stress (MPa) | 39 | 40 | 35 | 31 | 25 |

Figure 9:
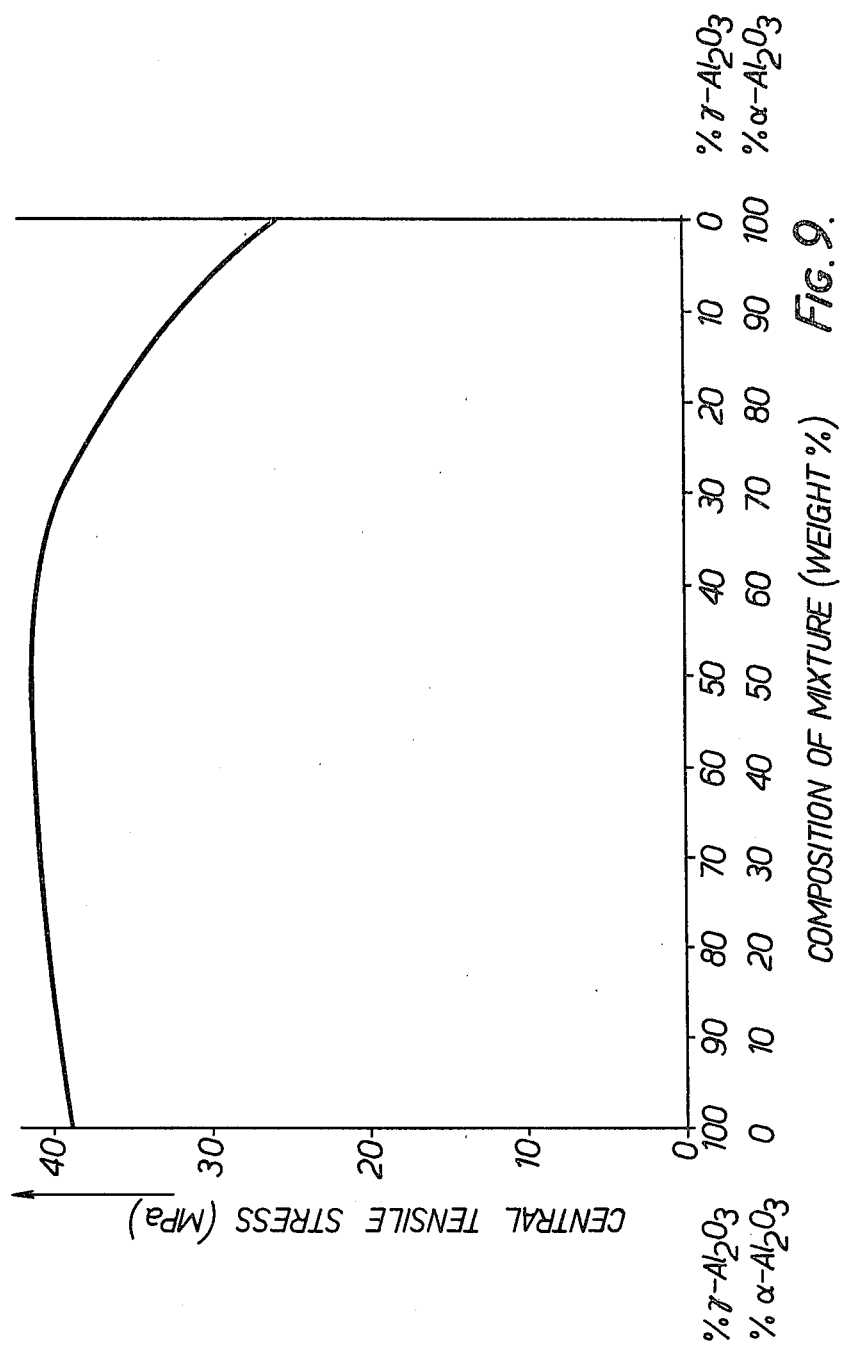

FIG. 9 illustrates the variation of central tensile stress with composition of the mixture.

The previous examples have shown how higher stresses can be produced by mixtures of a gas-generating particulate material with an inert material, then can be produced by use of the gas-generating particulate material alone. However, it may be desired to produce lower stress values than can be achieved by use of the gas-generating particulate material alone.

In this example this is achieved by use of an α-alumina having a small mean particle size and a relatively wide particle size distribution, which results in a significantly lower flowability than that of the α-aluminas used in the previous examples.

The maximum central tensile stress produced was 40 MPa using a mixture of 40% γ-alumina and 60% α-alumina having a flowability of 70. This is only marginal by higher than the central tensile stress of 39 MPa produced when using the γ-alumina alone.

Progressive addition of further α-alumina in the mixtures rapidly reduces the flowability of the mixtures to such low values such that the central tensile stress produced in the glass sheets is less than that produced by use of the γ-aluminas alone.

EXAMPLE 8

The fluidised bed was constituted by 70% by weight of γ-alumina and 30% by weight of α-alumina.

The characteristics of the γ-alumina were as follows:

| | |
|---|---|
| mean particle size | = 119 μm |
| particle size distribution | = 2.34 |
| flowability | = 90.25 |
| water content (weight loss at 800° C.) | = 4.3% |
| thermal capacity per unit volume at minimum fluidisation | = 1.09 MJ/m$^3$K |

The characteristics of the α-alumina were as follows:

| | |
|---|---|
| mean particle size | = 30 μm |
| particle size distribution | = 1.22 |
| flowability | = 70 |
| thermal capacity per unit volume at minimum fluidisation | = 1.3 MJ/m$^3$K |

The mixture had a flowability of 81.5 and a thermal capacity per unit volume at minimum fluidisation of 1.16 MJ/m$^3$K.

A glass sheet 2.3 mm thick was heated to 660° C. and quenched in the fluidised mixture, and the central tensile stress induced in the sheet was 43 MPa.

By varying the relative proportions of the constituents of the mixture a selected central tensile stress in the range 34 MPa to 43 MPa could be induced in similar sheets.

EXAMPLE 9

The fluidised bed was constituted by 20% by weight of aluminium monohydrate (Al$_2$O$_3$.2H$_2$O) in the form of Boehmite, which is a porous material containing 15% by weight of combined water of crystallization and 13% by weight of water adsorbed in its pores. Adsorbed water released during quenching of the glass is mainly effective as the gas-generation which gives rise to the enhanced agitation of the particulate material in the vicinity of the glass surfaces.

The aluminium monohydrate has the following characteristics:

| | |
|---|---|
| mean particle size | = 51 μm |
| particle size distribution | = 1.70 |
| flowability | = 78 |
| water content (weight loss at 800° C.) | = 28.4% |
| thermal capacity per unit volume at minimum fluidisation | = 1.18 MJ/m$^3$K |

The aluminium monohydrate was mixed with 80% by weight of the α-alumina used in Example 6.

The mixture had a flowability of 68 and a thermal capacity per unit volume at minimum fluidisation of 1.27 MJ/m$^3$K.

A glass sheet 2.3 mm thick was heated to 660° C. and quenched in the fluidised mixture, and the central tensile stress induced was 42 MPa. By varying the proportions of the constituents of the mixture a selected central tensile stress in the range 34 MPa to 42 MPa could be induced in the sheet.

EXAMPLE 10

The fluidised bed was constituted by 20% by weight of γ-alumina and 80% by weight of α-alumina.

The characteristics of the γ-alumina were as follows:

| | |
|---|---|
| mean particle size | = 70 μm |
| particle size distribution | = 1.47 |
| flowability | = 88.5 |
| water content (weight loss at 800° C.) | = 7% |
| thermal capacity per unit volume at minimum fluidisation | = 1.16 MJ/m$^3$K |

The characteristics of the α-alumina were as follows:

| | |
|---|---|
| mean particle size | = 30 μm |
| particle size distribution | = 1.68 |
| flowability | = 70 |
| thermal capacity per unit volume at minimum fluidisation | = 1.36 MJ/m$^3$K |

The mixture had a flowability of 70.25 and a thermal capacity per unit volume at minimum fluidisation of 1.35 MJ/m$^3$K.

A glass sheet 2.3 mm thick was heated to 660° C. and quenched in the fluidised mixture, and by varying the proportions of γ-alumina and α-alumina in the mixture a selected central tensile stress in the range 34 MPa to 49 MPa could be induced in the sheet, this upper value of 49 MPa being that induced by the 20% γ-alumina/80% α-alumina mixture.

EXAMPLE 11

The mixture of particulate materials for fluidisation comprised 20% by weight of γ-alumina, and 40% by weight of each of two α-aluminas which were readily available and which were used in place of a single scarcer α-alumina.

The characteristics of the γ-alumina were as follows:

| | |
|---|---|
| mean particle size | = 57 μm |
| particle size distribution | = 1.66 |
| flowability | = 85 |
| water content (weight loss at 800 C.) | = 7% |
| thermal capacity per unit volume at minimum fluidisation | = 1.18 MJ/m$^3$K |

The characteristics of the two α-aluminas A and B were as in Table V.

TABLE V

| | α-alumina | |
|---|---|---|
| | A | B |
| mean particle size (μm) | 38 | 24 |
| particle size distribution | 1.19 | 1.25 |
| flowability | 75 | 66 |
| thermal capacity per unit volume at minimum fluidisation (MJ/m$^3$K) | 1.14 | 1.19 |

The flowability of the mixture was 73.5 and its thermal capacity per unit volume at minimum fluidisation was 1.25 MJ/m$^3$K.

A glass sheet 2.3 mm thick was heated to 660° C. and quenched in the fluidised mixture and the central tensile stress induced in the sheet was 48 MPa. By varying the selected relative proportions of the constituents of the mixture a selected central tensile stress in the range 34 MPa to 48 MPa could be induced in the sheet.

EXAMPLE 12

The versatility of the method of the invention is further illustrated by tailoring a mixture of several gas-generating constituents and several inert constituents, all of which are available and relative cheap materials, in order to produce a mixture having gas-generating properties, and an optimum flowability and thermal capacity which produces required stresses in the glass quenched in that mixture when in a quiescent uniformly expanded state of particulate fluidisation.

In this example 5% by weight of each of the four γ-aluminas, A, B, C and D described in Example 7, Table III, that is a total of 20% by weight of γ-alumina, was mixed with 26.67% by weight of each of three γ-aluminas E, F and G whose characteristics were as set out in Table VI.

TABLE VI

| | α-alumina | | |
|---|---|---|---|
| | E | F | G |
| mean particle size (μm) | 38 | 30 | 24 |
| particle size distribution | 1.19 | 1.22 | 1.25 |
| flowability | 75 | 70 | 66 |
| thermal capacity per unit volume at minimum fluidisation (MJ/m$^3$K) | 1.38 | 1.3 | 1.19 |

The flowability of the mixture was 74 and its thermal capacity per unit volume at minimum fluidisation was 1.26 MJ/m$^3$K.

A glass sheet 2.3 mm thick was heated to 660° C. and quenched in the fluidised mixture and the central tensile stress induced in the sheet was 49 MPa. By varying the selected proportions of the γ-aluminas constituting 20% by weight of the mixture, or by varying the proportions of the α-aluminas constituting 80% by weight of the mixture, or by varying the relative proportions of total γ-alumina to total α-alumina in the mixture a selected central tensile stress in the range 32 to 49 MPa could be induced.

EXAMPLE 13

The fluidised bed was constituted by 8% by weight of a porous aluminosilicate material, each particle of which contains 13% by weight alumina and 86% by weight silica, and which is porous with water adsorbed in its pores; mixed with the three α-aluminas E, F and G of Example 12, Table VI in the following proportions by weight:

| α-alumina | |
|---|---|
| E | 23% |
| F | 46% |
| G | 23% |

The characteristics of the aluminosilicate material were as follows:

| | |
|---|---|
| mean particle size | = 99 μm |
| particle size distribution | = 1.47 |
| flowability | = 82 |
| water content (weight at loss 800° C.) | = 10% |
| thermal capacity per unit volume at minimum fluidisation | = 0.76 MJ/m$^3$K |

The flowability of the mixture was 74.5 and its thermal capacity per unit volume at minimum fluidisation was 1.25 MJ/m$^3$K.

A glass sheet 2.3 mm thick was heated to 660° C. and quenched in the fluidised mixture, and the central tensile stress induced in the sheet was 47 MPa. By varying the relative proportions of aluminosilicate and α-alumina a selected central tensile stress in the range 34 MPa to 47 MPa could be induced in the sheet.

EXAMPLE 14

The same three α-aluminas as described in Example 12, Table VI were used in the following proportions by weight:

| α-alumina | |
|---|---|
| E | 23% |
| F | 44% |
| G | 23% |

The proportions of the α-aluminas were mixed with 10% by weight of a similar 13%/86% aluminosilicate material to that of Example 13, but which has the following characteristics:

| | |
|---|---|
| mean particle size | = 67 μm |
| particle size distribution | = 1.35 |
| flowability | = 83 |
| water content (weight loss at 800° C.) | = 10% |
| thermal capacity per unit volume at minimum fluidisation | = 0.76 MJ/m$^3$K. |

The flowability of the mixture was 74.25 and its thermal capacity per unit volume at minimum fluidisation was 1.24 MJ/m$^3$K.

A sheet of glass 2.3 mm thick was heated to 660° C. and quenched in the fluidised mixture, and the central tensile stress induced in the sheet was 52 MPa. Selected mixtures of the aluminosilicate and α-alumina materials in predetermined proportions could be produced to induce as required a central tensile stress in the range 34 MPa to 52 MPa in a similarly prepared glass sheet.

EXAMPLE 15

The same three α-aluminas described in Example 12, Table VI were used.

The fluidised mixture consisted of 26.67% by weight of each of the three α-aluminas E, F and G and 20% by weight of the aluminium monohydrate (Al$_2$O$_3$1H$_2$O) of Example 9.

The flowability of the mixture was 78.75 and its thermal capacity per unit volume at minimum fluidisation was 1.27 MJ/m$^3$K.

A glass sheet 2.3 mm thick was heated to 660° C. and quenched in the fluidised mixture and the central tensile stress induced in the sheet was 48 MPa. A selected central tensile stress in the range 34 MPa to 48 MPa could be induced in a 2.3 mm glass sheet heated to 660° C. by selection of the relative proportions of the aluminium monohydrate and the three α-aluminas in the mixture.

EXAMPLE 16

The fluidised particulate material consisted of 20% by weight of the aluminium monohydrate of Example 9, mixed with 80% by weight of silicon carbide having the following characteristics:

| | |
|---|---|
| mean particle size | = 32 μm |
| particle size distribution | = 1.431 |
| flowability | = 66.5 |
| thermal capacity per unit volume at minimum fluidisation | = 0.99 MJ/m³K. |

The flowability of the mixture was 74 and its thermal capacity per unit volume at minimum fluidisation was 1.024 MJ/m³K.

A glass sheet 2.3 mm thick was heated to 660° C. and quenched in the fluidised mixture, and the central tensile stress induced in the sheet was 48.5 MPa. By selecting the relative proportions of the constituents in the mixture a selected stress in the range 36 MPa to 48.5 MPa could be induced in the sheet.

EXAMPLE 17

The fluidised particulate material consisted of 17% by weight of the aluminium monohydrate of Example 9, mixed with 83% by weight of silicon carbide having the following characteristics:

| | |
|---|---|
| mean particle size | = 40 μm |
| particle size distribution | = 1.32 |
| flowability | = 72.75 |
| thermal capacity per unit volume at minimum fluidisation | = 1.21 MJ/m³K |

The flowability of the mixture was 75, and its thermal capacity per unit volume at minimum fluidisation was 1.02 MJ/m³K.

A glass sheet 2.3 mm thick was heated to 660° C. and quenched in the fluidised mixture, and the central tensile stress induced in the sheet was 51 MPa. These materials provided the facility for inducing a selected central tensile stress in a broad range, 32 MPa to 51 MPa, by selection of the predetermined proportions of the constituents of the mixture to tailor the fluidised mixture to the production of the required stress in the glass.

EXAMPLE 18

The fluidised bed was constituted by a mixture of γ-alumina as the gas generating component with a proportion of spheroidal iron oxide (α-Fe₂O₃) and one or two kinds of α-alumina.

The γ-alumina had the following characteristics:

| | |
|---|---|
| mean particle size | = 84 μm |
| particle size distribution | = 1.94 |
| flowability | = 87.25 |
| water content (weight loss at 800° C.) | = 6% |
| thermal capacity per unit volume at minimum fluidisation | = 1.063 MJ/m³K |

The spheroidal iron oxide had the following characteristics:

| | |
|---|---|
| mean particle size | = 41 μm |
| particle size distribution | = 1.69 |
| flowability | = 76.5 |
| thermal capacity per unit volume at minimum fluidisation | = 2.01 MJ/m³K |

The first α-alumina was that as used in Example 1.
The second α-alumina had the following characteristics:

| | |
|---|---|
| mean particle size | = 24 μm |
| particle size distribution | = 1.25 |
| flowability | = 66 |
| thermal capacity per unit volume at minimum fluidisation | = 1.192 MJ/M³K |

Glass sheets of soda-lime-silica composition 2.3 mm thick were heated to 660° C. and quenched in fluidised mixtures of the above materials which were in a quiescent uniformly expanded state of particulate fluidisation.

The characteristics of the mixtures and the resulting central tensile stresses produced in the glass sheets were as given in Table VII.

TABLE VII

| | Percentage by weight in mixture | | | | |
|---|---|---|---|---|---|
| | (1) | (2) | (3) | (4) | (5) |
| γ-alumina | 70% | 50% | 30% | 20% | 16% |
| Spheroidal iron oxide | 30% | 50% | 70% | 35% | 28% |
| α-alumina (1) | — | — | — | 45% | 36% |
| α-alumina (2) | — | — | — | — | 20% |
| flowability of mixture | 82 | 79 | 78 | 74 | 73.5 |
| thermal capacity of mixture per unit volume at minimum fluidisation MJ/m³K | 1.347 | 1.54 | 1.726 | 1.502 | 1.44 |
| Central Tensile Stress (MPa) | 45 | 49 | 50 | 57 | 53.0 |

Figure 10:
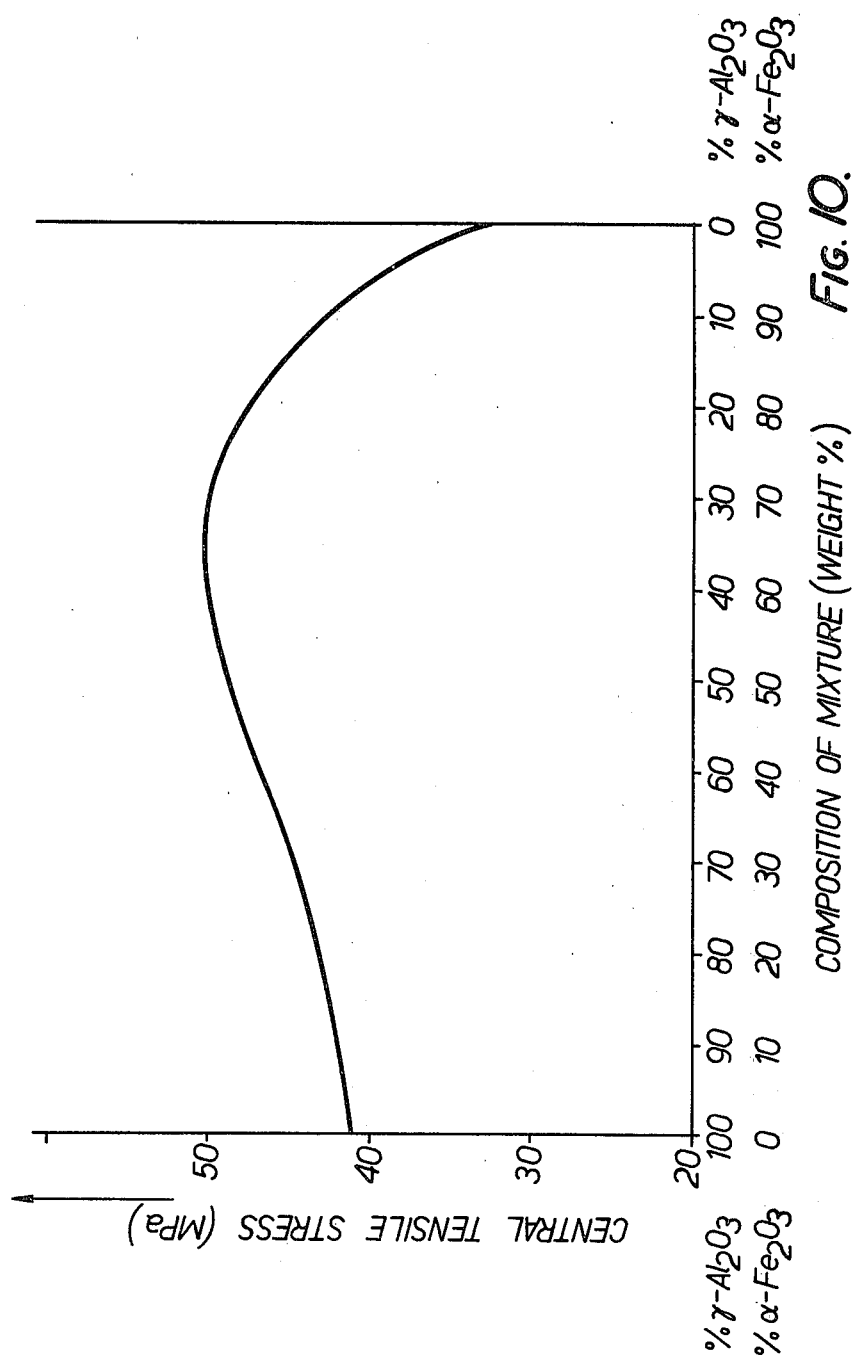

FIG. 10 illustrates the variation of central tensile stress with composition of the mixtures (1), (2), and (3) of γ-alumina and α-Fe₂O₃ in Table VII. The central tensile stresses resulting from use of the γ-alumina alone and the α-Fe₂O₃ alone were 41 MPa and 32 MPa respectively.

As in Example 1 the γ-alumina used in this example has a flowability which is too high for the production of maximum toughening stress in glass sheets. The spheroidal iron oxide has a lower flowability than the γ-alumina particularly because of its smaller mean particle size. The addition of increasing amounts of the spheroidal iron oxide to the γ-alumina in the mixtures (1), (2) and (3) of Table VII has a progressive effect of lowering the flowability of the mixture by progressively lowering the mean particle size of the mixture as the amount of spheroidal iron oxide in the mixture is increased. As the flowability of the mixture decreases there is a progressive increase in the central tensile stress produced in the glass sheets. A maximum central tensile stress of 50 MPa is achieved when the mixture contains about 70% spheroidal iron oxide and 30% γ-alumina.

The flowability of the spheroidal iron oxide is not as low as that of the α-alumina used in Examples 1 and 4 because it is of larger mean particle size and the particles are smoothly rounded as compared with the angular particles of the α-alumina. Therefore the spheroidal iron oxide is not so effective in lowering the flowability of the mixture as is the α-alumina of Example 4.

Mixture (3) of the present example containing 70% by weight spheroidal iron oxide and 30% by weight γ-alumina, which produces the maximum central tensile stress of 50 MPa, has a flowability of 78 which is higher than the optimum flowability of 74 of the mixture of 70% by weight of α-alumina and 30% by weight of γ-alumina which produces high central tensile stress in Example 4.

The maximum central tensile stress produced by mixture (3) of Table VII in the present example is however about the same as the maximum central tensile stress produced by the 30% γ-alumina/70% α-alumina mixture of Example 4. This is because, although the flowability of mixture (3) is a little higher than the optimum flowability at which maximum stress will be produced, the spheroidal iron oxide used in mixture (3) has a significantly higher thermal capacity than that of the α-alumina used in Example 4.

Because the flowability of mixture (3) was thought to be slightly too high, mixture (4) was then made up, containing a proportion of the α-alumina used in Example 4. This reduced flowability of the mixture to an optimum value of 74, and the mixture produced a further increase in central tensile stress to 57 MPa, despite the lowering of the thermal capacity.

Mixture (4) has the same optimum value of flowability 74, as the mixture of Example 4 consisting of 30% γ-alumina and 70% α-alumina, which produces a maximum central tensile stress of 49 MPa. The fact that mixture (4) produces a higher central tensile stress of 57 MPa is due to the higher thermal capacity of mixture (4), that is 1.502 MJ/m$^3$K as compared with 1.24 MJ/m$^3$K of the 30%/70% mixture of Example 4.

The further reduction in the flowability resulting from the inclusion of a proportion of a second α-alumina in mixture (5) has produced a reduction of the thermal capacity of the mixture as compared with mixture (4) with an accompanying small reduction in central tensile stress.

EXAMPLE 19

The fluidised particulate material consisted of a mixture of the aluminium monohydrate of Example 9, and zircon (ZrO$_2$SiO$_2$) which is an inert non-porous zirconia-orthosilicate of higher thermal capacity than α-alumina, and has the following characteristics:

| | |
|---|---|
| mean particle size | = 34 μm |
| particle size distribution | = 1.73 |
| flowability | = 67 |
| thermal capacity per unit volume at minimum fluidisation | = 1.76 MJ/m$^3$K |

Glass sheets 2.3 mm thick were heated to 660° C. and quenched in mixtures of the aluminium monohydrate and zircon as set out in Table VIII, which sets out the characteristics of the mixtures and the central tensile stress produced in the glass sheets.

TABLE VIII

| | Percentage by weight in mixture | | | | | |
|---|---|---|---|---|---|---|
| Aluminium monohydrate | 100% | 70% | 50% | 20% | 10% | 0% |
| zircon | 0% | 30% | 50% | 80% | 90% | 100% |
| flowability of mixture | 78 | 75.5 | 74 | 73 | 71 | 67 |
| thermal capacity of mixture per unit volume at minimum fluidisation (MJ/m$^3$K) | 1.005 | 1.277 | 1.41 | 1.62 | 1.70 | 1.76 |
| Central Tensile Stress (MPa) | 37 | 42 | 44 | 46.5 | 39 | 23 |

FIG. 11 illustrates the variation of central tensile stress with composition of the mixture.

Aluminium monohydrate has good gas generating properties and a lower value of flowability than that of the γ-aluminas referred to in Examples 1 and 4. However the flowability of the aluminium monohydrate is higher than the optimum flowability which will produce maximum central tensile stress and the thermal capacity is relatively low. Zircon has a lower flowability and higher thermal capacity than the aluminium monohydrate, and as the proportion of zircon in the mixture is increased there is a progressive increase in the central tensile stress produced in the glass due both to the progressive lowering of the flowability and increase in the thermal capacity of the mixture.

The zircon has a high thermal capacity which contributes significantly to the increase in central tensile stress produced in the glass sheets, in the same way as the spheroidal iron oxide of Example 18. Because the zircon has a lower flowability than the spheroidal iron oxide of Example 18, it is more effective in reducing the flowability of the mixture, and therefore makes a greater contribution to the increase in central tensile stress brought about by the reduction in the value of flowability of the mixture.

The maximum central tensile stress of 46.5 MPa is achieved when the mixture contains about 20% alumimium monohydrate and 80% zircon, which mixture has a flowability at an optimum value of 73.

Further addition of zircon about 80% by weight raises the thermal capacity of the mixture, but results in a decrease in central tensile stress due to significant reduction of the flowability below the optimum value, and reduction of the proportion of the gas-generating constituent, aluminium monohydrate, to a less effective level.

EXAMPLE 20

In a two-component mixture, both particulate materials may have gas-generating properties. A mixture was made of equal proportions by weight of γ-alumina and aluminium trihydrate (Al$_2$O$_3$.3H$_2$O). A proportion of the water of crystallisation of the aluminium trihydrate is released on heating, which adds to the effect of the water released from the pores of the γ-alumina.

The characteristics of the γ-alumina were as follows:

| | |
|---|---|
| mean particle size | = 60 μm |
| particle size distribution | = 1.9 |
| flowability | = 84 |
| water content (weight loss at 800° C.) | = 8% |
| thermal capacity per unit volume at minimum fluidi- | |

-continued

| | |
|---|---|
| sation | = 1.05 MJ/m³K |

The characteristics of the aluminium trihydrate were as follows:

| | |
|---|---|
| mean particle size | = 86 μm |
| particle size distribution | = 1.42 |
| flowability | = 86 |
| water content (weight loss at 800° C.) | = 34% |
| thermal capacity per unit volume at minimum fluidisation | = 1.56 MJ/m³K |

The flowability of the mixture was 85.25 and its thermal capacity per unit volume at minimum fluidisation was 1.31 MJ/m³K.

A glass sheet 2.3 mm thick was heated to 660° C. and quenched in the fluidised mixture, and the central tensile stress induced in the sheet was 47 MPa. A selected central tensile stress in the range 42 MPa to 47 MPa could be induced in the glass sheet by suitable selection of the relative proportions of the two gas-generating materials.

EXAMPLE 21

Gas generating particulate materials which will evolve gases other than water vapour on heating can be used, for example sodium bicarbonate (NaHCO$_3$) which releases carbon dioxide as well as water. A mixture of 10% by weight of sodium bicarbonate containing 0.6% by weight of colloidal silica to improve its flowability, with 90% by weight of the α-alumina A of Table V of Example 11 was used.

The characteristics of the sodium bicarbonate/colloidal silica mixture were as follows:

| | |
|---|---|
| mean particle size | = 70 μm |
| particle size distribution | = 1.98 |
| flowability | = 75 |
| H$_2$O + CO$_2$ content (weight loss at 800° C.) | = 37% |
| thermal capacity per unit volume at minimum fluidisation | = 1.41 MJ/m³K |

The flowability of the fluidised mixture was 75, and its thermal capacity per unit volume at minimum fluidisation was 1.38 MJ/m³K.

A glass sheet 2.3 mm thick was heated to 660° C. and then quenched in the fluidised mixture, and the central tensile stress induced in the sheet was 53.5 MPa. By suitable selection of the relative proportions of the constituents of the mixture a selected central tensile stress in the range 34 MPa to about 55 MPa could be induced in the glass sheet.

In many of the examples an indication of the stresses induced in the glass when quenched in the fluidised mixture of particulate materials, is given in terms of the stresses induced in a 2.3 mm thick sheet of soda-lime-silica glass heated to 660° C. and then quenched. In the same way as described in Examples 1 to 3 different stresses can be achieved by varying the temperature to which the glass is heated, and proportionately higher stresses are induced in thicker glass.

The examples all illustrate that by selecting a proportion of a gas-generating particulate material which is capable of evolving from 4% to 47% of its own weight of gas when heated to a constant weight at 800° C., and then mixing that gas-generating material in predetermined proportions with other gas-generating particulate materials or with inert materials, the mixture can be tailored to produce a desired flowability in the range 60 to 86 and a thermal capacity per unit volume at minimum fluidisation in the range 1.02 to 1.75 MJ/m³K, which ensures that the glass sheet quenched in the mixture is toughened to the required degree, indicated in the examples by the central tensile stress.

As is usual in thermally toughened glass, the ratio of surface compressive stress to central tensile stress is of the order of 2:1 and the surface compressive stress induced is usually about twice the quoted central tensile stress.

By employing the method of the invention toughening conditions can be readily reproduced and it is possible to make use of a wide range of particulate materials, as available, and to employ blends of cheaper and more readily available particulate materials in place of scarcer and more expensive single components of the mixture, so that operating costs are reduced.

Further, by appropriate selection of the particulate materials and of the proportions in which they are mixed, it is possible to produce in glass selected higher toughening stresses than the stresses which could be achieved by any of the constituents of the mixture used alone.

Some of the particulate materials described above were commercially available with an appropriate mean particle size, particle size distribution, flowability and thermal capacity.

When these characteristics of the required material, e.g. γ-alumina, were not present in commercially available materials sieving was employed to produce refined particulate materials having required characteristics for mixing with other constituents to produce a mixture which, when fluidised, would induce required toughening stresses in the glass.

The fluidised mixtures of Examples 1 to 4, 8 and 10 to 21 have been found to be particularly suitable for the thermal toughening of glass sheets for lamination in the manufacture of automobile windscreens. The flowability of such mixtures is in the range 71 to 83, their gas content in terms of weight loss when heated to constant weight at 800° C. is in the range 4% to 37% and their thermal capacity per unit volume at minimum fluidisation is in the range 1.09 to 1.38 MJ/m³K.

Selection of the proportions of the constituents of mixture is possible to produce lower stresses in the glass than those produced by either constituent. This is illustrated by Example 7.

We claim:

1. A method of thermally toughening glass comprising:
    heating the glass to a temperature above its strain point;
    chilling the hot glass by contact with a gas-fluidised particulate material which comprises a mixture in predetermined proportions of a number of selected particulate materials, at least one of which has gas-generating properties;
    selecting the gas-generating particulate material from the group consisting of γ-alumina, aluminum trihydrate, aluminum monohydrate, aluminosilicate and sodium bicarbonate; and mixing said selected particulate materials in predetermined proportions which are tailored to impart to the mixture a thermal capacity per unit volume at minimum fluidisation in the range 1.02 to 1.73 MJ/m$^3$K and a flowability in the range 60 to 86.

2. The method of claim 1 wherein the mixture includes a particulate material selected from the group consisting of α-alumina, zircon, silicon carbide, spheroidal iron oxide and mixtures thereof.

3. The method of claim 2 wherein the glass is a sheet of soda-lime-silica glass having a thickness in the range 2 mm. to 2.5 mm. which is heated to a temperature in the range 610° C. to 680° C. and the toughened glass sheet has a central tensile stress in the range 35 to 57 MPa.

4. The method of claim 1 wherein the mixture includes at least one particulate metal oxide whose thermal capacity per unit volume at minimum fluidisation is in the range 1.77 to 2.01 MJ/m$^3$K and wherein the mixture has a thermal capacity per unit volume at minimum fluidisation in the range 1.5 to 1.73 MJ/m$^3$K and a flowability in the range 73 to 78.

5. A method of thermally toughening glass comprising:
heating the glass to a temperature above its strain point;
chilling the hot glass by contact with a gas-fluidised particulate material which comprises a mixture in predetermined proportions of at least one particulate metal oxide whose thermal capacity per unit volume at minimum fluidisation is in the range 1.76 to 2.01 MJ/m$^3$K and at least one particulate material having gas-generating properties;
selecting as the gas-generating particulate material a material which is capable of evolving from 4% to 37% of its own weight of gas when heated to a constant weight at 800° C., said gas-generating particulate material being selected from the group consisting of γ-alumina, aluminum trihydrate, aluminum monohydrate, aluminosilicate, and sodium bicarbonate; and
mixing said selected particulate materials in predetermined proportions which are tailored to impart to the mixture a thermal capacity per unit volume at minimum fluidisation in the range 1.27 to 1.76 MJ/m$^3$K and a flowability in the range 73 to 78.

6. A method of thermally toughening glass comprising:
heating the glass to a predetermined temperature above its strain point;
contacting the hot glass with a gas-fluidised particulate material which comprises a mixture of selected particulate materials, including a particulate γ-alumina and a particulate α-alumina, which γ-alumina has gas-generating properties when heated by said hot glass; and
mixing said selected particulate γ-alumina and particulate α-alumina in selected predetermined proportions which are tailored to impart to the mixture a thermal capacity and flowability such that required toughening stresses are induced by the gas-fluidised mixture in the glass.

7. A method according to claim 6, wherein the mixture comprises from 7% to 86% by weight of γ-alumina and from 93% to 14% by weight of α-alumina.

8. A method of thermally toughening glass comprising:
heating the glass to a temperature above its strain point;
contacting the hot glass with a gas-fluidised mixture of selected particulate materials including a proportion of γ-alumina having gas-generating properties when heated by said hot glass; and
tailoring the proportions of the γ-alumina and at least one other particulate material in said mixture to impart to the mixture a thermal capacity, determined as the thermal capacity per unit volume at minimum fluidisation and a flowability, such that predetermined toughening stresses are induced in the glass as it cools in said gas-fluidised mixture.

9. A method according to claim 8, wherein the mixture comprises aluminum trihydrate (Al$_2$O$_3$.3H$_2$O) and γ-alumina in equal proportions.

10. A method of thermally toughening glass comprising:
heating the glass to a predetermined temperature above its strain point;
contacting the hot glass with a gas-fluidised particulate material which comprises from 8 to 10% by weight of a particulate aluminosilicate which has gas-generating properties when heated by hot glass and from 92 to 90% by weight of α-alumina; and
mixing said aluminosilicate and α-alumina in selected predetermined proportions which are tailored to impart to the mixture a thermal capacity, determined as the thermal capacity per unit volume at minimum fluidisation, and a flowability such that required toughening stresses are induced in the glass as it cools in the gas-fluidised mixture.

11. A method according to claim 10, wherein the aluminosilicate is zeolite.

12. A method of thermally toughening glass comprising:
heating the glass to a predetermined temperature above its strain point;
contacting the hot glass with a gas-fluidised particulate material which comprises particulate aluminum monohydrate (Al$_2$O$_3$.1H$_2$O) and at least one inert particulate material selected from the group consisting of α-alumina, silicon carbide and zircon; and
mixing the aluminum monohydrate and the inert material in selected predetermined proportions which are tailored to impart to the mixture a thermal capacity and flowability such that required toughening stresses are induced by said gas-fluidised mixture in the glass.

13. A method according to claim 12, wherein the mixture comprises from 17% to 20% by weight of aluminum monohydrate and from 83 to 80% by weight of α-alumina.

14. A method according to claim 12, wherein the mixture comprises from 17% to 20% by weight of aluminum monohydrate and from 83% to 80% by weight of silicon carbide.

15. A method according to claim 12, wherein the mixture comprises 17% by weight of aluminum monohydrate mixed with 83% by weight of silicon carbide.

16. A method according to claim 12, wherein the mixture comprises from 10% to 70% by weight of aluminum monohydrate and from 90% to 30% by weight of zircon.

17. A method according to claim 12, wherein the mixture comprises 20% by weight of aluminum monohydrate and 80% by weight of zircon (ZrO$_2$.SiO$_2$).

18. A method of thermally toughening glass comprising:
  heating the glass to a predetermined temperature above its strain point;
  contacting the hot glass with a gas-fluidised particulate material which comprises a mixture of particulate γ-alumina having gas-generating properties with at least one particulate metal oxide whose thermal capacity per unit volume at minimum fluidisation is in the range 1.76 to 2.01 MJ/m³K; and
  mixing the γ-alumina and metal oxide in selected predetermined proportions which are tailored such that required toughening stresses are induced in the glass as it cools in said gas-fluidised mixture.

19. A method according to claim 18, wherein the metal oxide is spheroidal iron oxide (α-Fe₂O₃).

20. A method according to claim 19, wherein the mixture comprises from 30% to 70% by weight of spheroidal iron oxide.

21. A method according to claim 19, wherein the mixture comprises from 35% to 70% by weight of spheroidal iron oxide.

22. A method according to claim 21, wherein the mixture comprises from 30% to 70% by weight of γ-alumina.

23. A method according to claim 20, wherein the mixture comprises 30% by weight of γ-alumina and 70% by weight of spheroidal iron oxide.

24. A method according to claim 19, wherein the mixture comprises from 28% to 35% by weight of spheroidal iron oxide and from 45% to 56% by weight of α-alumina, the remainder being γ-alumina as gas-generating material.

25. A method according to claim 19, wherein the mixture comprises 20% by weight of γ-alumina, 45% by weight of α-alumina and 35% by weight of spheroidal iron oxide.

26. A method of thermally treating glass comprising heating the glass to a predetermined temperature, contacting the hot glass with a gas-fluidised particulate material which comprises a mixture of a number of selected particulate materials, at least one of said particulate materials being capable of evolving from 4% to 37% of its own weight of gas when heated to a constant weight at 800° C., and mixing said selected materials in selected predetermined proportions which are tailored to impart to the mixture of particulate materials a thermal capacity, determined as the thermal capacity per unit volume at minimum fluidisation in the range 1.02 to 1.73 MJ/m³K, and a flowability in the range 60 to 86 such that a required thermal treatment of the glass by the gas-fluidised mixture is achieved whereby the tailored mixture imparts higher stresses than the stresses which could be achieved by any of the constituents of the tailored mixture used alone.

27. A method of thermally toughening glass comprising:
  heating the glass to a temperature above its strain point;
  chilling the hot glass by contact with a gas-fluidised particulate material which comprises a mixture in predetermined proportions of a number of selected particulate materials, at least one of which has gas-generating properties;
  selecting as the gas-generating particulate material a material which is capable of evolving from 4% to 37% of its own weight of gas when heated to a constant weight at 800° C.; and
  mixing said selected particulate materials in predetermined proportions which are tailored to impart to the mixture a thermal capacity per unit volume at minimum fluidisation in the range 1.02 to 1.73 MJ/m³K and a flowability in the range 60 to 86, whereby the tailored mixture imparts higher toughening stresses than the stresses which could be achieved by any of the constituents of the tailored mixture used alone.

28. A method of thermally toughening glass comprising:
  heating the glass to a temperature above its strain point;
  chilling the hot glass by contact with a gas-fluidised particulate material which comprises a mixture in predetermined proportions of a number of selected particulate materials, at least one of which has gas-generating properties;
  placing the gas-fluidised particulate material in a quiescent uniformly expanded state of particulate fluidisation by control of the distribution of fluidising gas in the particulate material at a gas flow velocity through the particulate material between that velocity corresponding to minimum fluidisation and that velocity corresponding to maximum expansion of the particulate material;
  selecting the gas-generating particulate material from the group consisting of γ-alumina, aluminium trihydrate, aluminium monohydrate, aluminosilicate and sodium bicarbonate; and mixing said selected particulate materials in predetermined proportions which are tailored to impart to the mixture a thermal capacity per unit volume at minimum fluidisation in the range 1.02 to 1.73 MJ/m³K and a flowability in the range 60 to 80.

29. The method of claim 28, wherein the mixture includes a particulate material selected from the group consisting of α-alumina, zircon, silicon carbide, spheroidal iron oxide and mixtures thereof.

30. A method of thermally treating glass comprising:
  heating the glass to a predetermined temperature;
  contacting the hot glass with a gas-fluidised particulate material which comprises a mixture of a number of selected particulate materials, at least one of said particulate materials being capable of evolving from 4% to 37% of its own weight of gas when heated to a constant weight at 800° C.;
  placing said gas-fluidised particulate material in a quiescent uniformly expanded state of particulate fluidisation by control of the distribution of fluidising gas in the particulate material at a gas flow velocity through the particulate material between that velocity corresponding to minimum fluidisation and that velocity corresponding to maximum expansion of the particulate material; and
  mixing said selected materials in selected predetermined proportions which are tailored to impart to the mixture of particulate materials a thermal capacity, determined as the thermal capacity per unit volume at minimum fluidisation, in the range 1.02 to 1.73 MJ/m³K, and a flowability in the range 60 to 86 such that a required thermal treatment of the glass by the gas-fluidised mixture is achieved whereby the tailored mixture imparts higher stresses than the stresses which could be achieved by any of the constituents of the tailored mixture used alone.

* * * * *